(12) United States Patent
Kim

(10) Patent No.: US 11,906,012 B2
(45) Date of Patent: Feb. 20, 2024

(54) HYDRAULIC MOUNT FOR VEHICLE

(71) Applicants: Hyundai Motor Company, Seoul (KR); Kia Corporation, Seoul (KR)

(72) Inventor: Seung Won Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 17/503,893

(22) Filed: Oct. 18, 2021

(65) Prior Publication Data
US 2022/0290733 A1   Sep. 15, 2022

(30) Foreign Application Priority Data
Mar. 9, 2021   (KR) .................. 10-2021-0030659

(51) Int. Cl.
*F16F 13/14*   (2006.01)
*F16F 13/16*   (2006.01)
*B60K 1/00*   (2006.01)

(52) U.S. Cl.
CPC ............... *F16F 13/16* (2013.01); *B60K 1/00* (2013.01); *F16F 13/1463* (2013.01); *F16F 13/1481* (2013.01)

(58) Field of Classification Search
CPC .... F16F 13/16; F16F 13/1427; F16F 13/1463; F16F 13/1481
USPC ......... 267/141, 140.12, 140.13, 141.2, 141.4
See application file for complete search history.

(56) References Cited

U.S. PATENT DOCUMENTS

| 6,386,529 | B2 * | 5/2002 | Bik ..................... F16F 13/16 267/293 |
| 7,198,258 | B2 * | 4/2007 | Sato .................... F16F 13/1409 267/140.13 |
| 2022/0290733 | A1 * | 9/2022 | Kim .................... F16F 13/1481 |

FOREIGN PATENT DOCUMENTS

| DE | 4117128 A1 * | 11/1992 | .......... F16F 13/1463 |
| DE | 4117129 A1 * | 11/1992 | .............. F16F 13/16 |
| GB | 2351139 A  * | 12/2000 | ............ F16F 1/3863 |
| JP | 63266240 A * | 11/1998 | .............. F16F 13/16 |

* cited by examiner

*Primary Examiner* — Thomas J Williams
(74) *Attorney, Agent, or Firm* — Fox Rothschild LLP

(57) ABSTRACT

A hydraulic mount for a vehicle is configured to control and damp the behavior of a motor mounted on a vehicle body. The hydraulic mount includes: an inner pipe; a main rubber molded on an outer circumferential surface of the inner pipe and having an upper front liquid chamber and an upper rear liquid chamber, and a lower front liquid chamber and a lower rear liquid chamber; and an outer pipe fitted to an outer circumferential surface of the main rubber to seal the liquid chambers, wherein the main rubber includes a first flow path connecting the upper front liquid chamber and the lower rear liquid chamber filled with fluid such that the fluid is movable therebetween; and a second flow path connecting the upper rear liquid chamber and the lower front liquid chamber filled with fluid such that the fluid is movable therebetween.

18 Claims, 23 Drawing Sheets

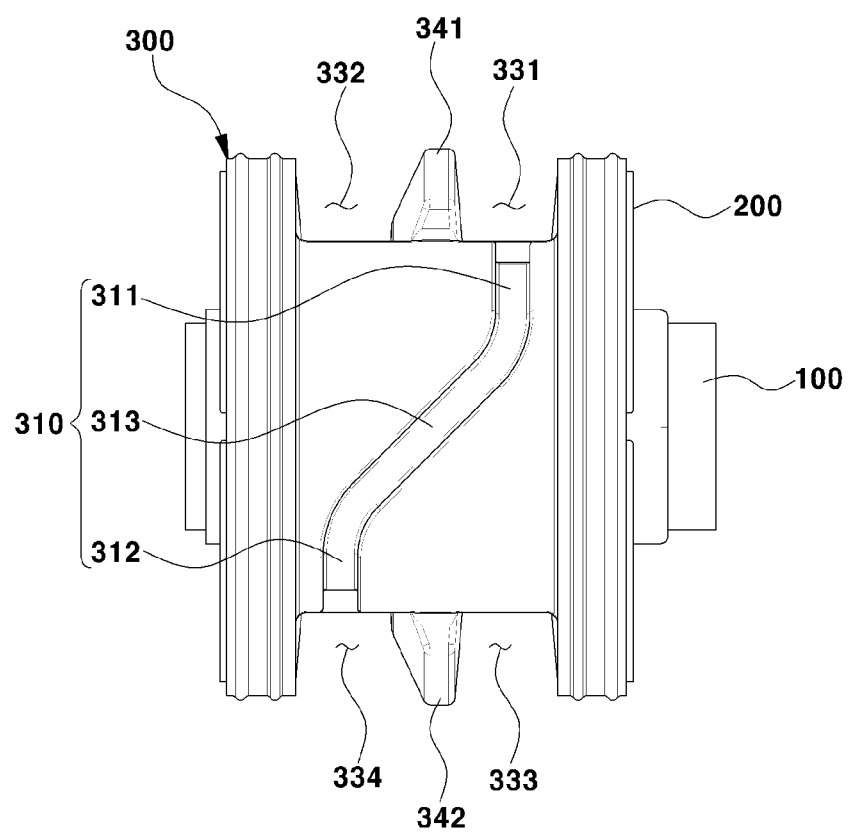

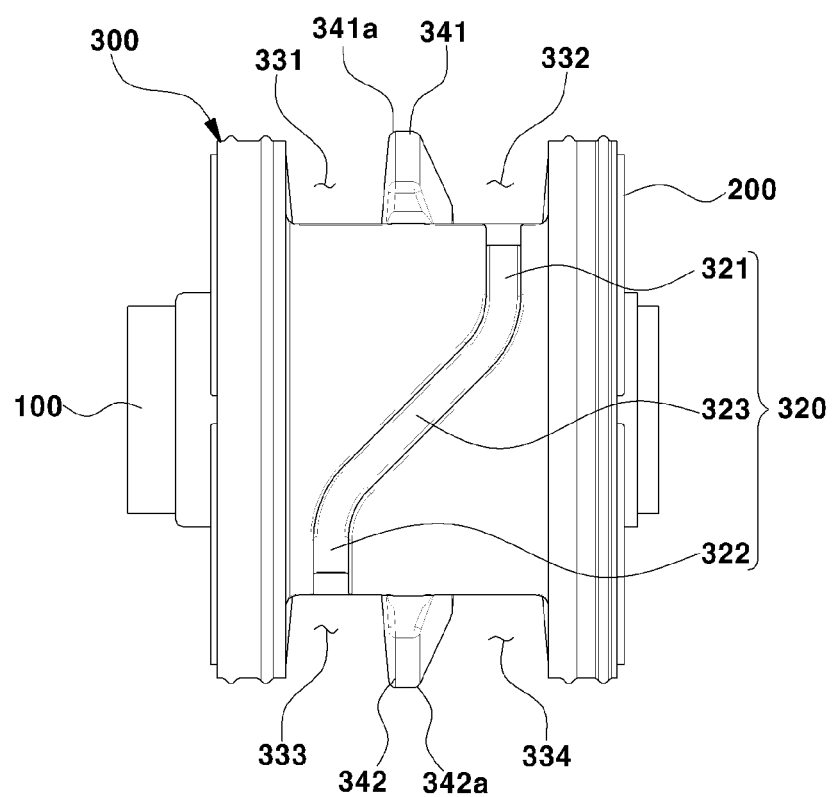

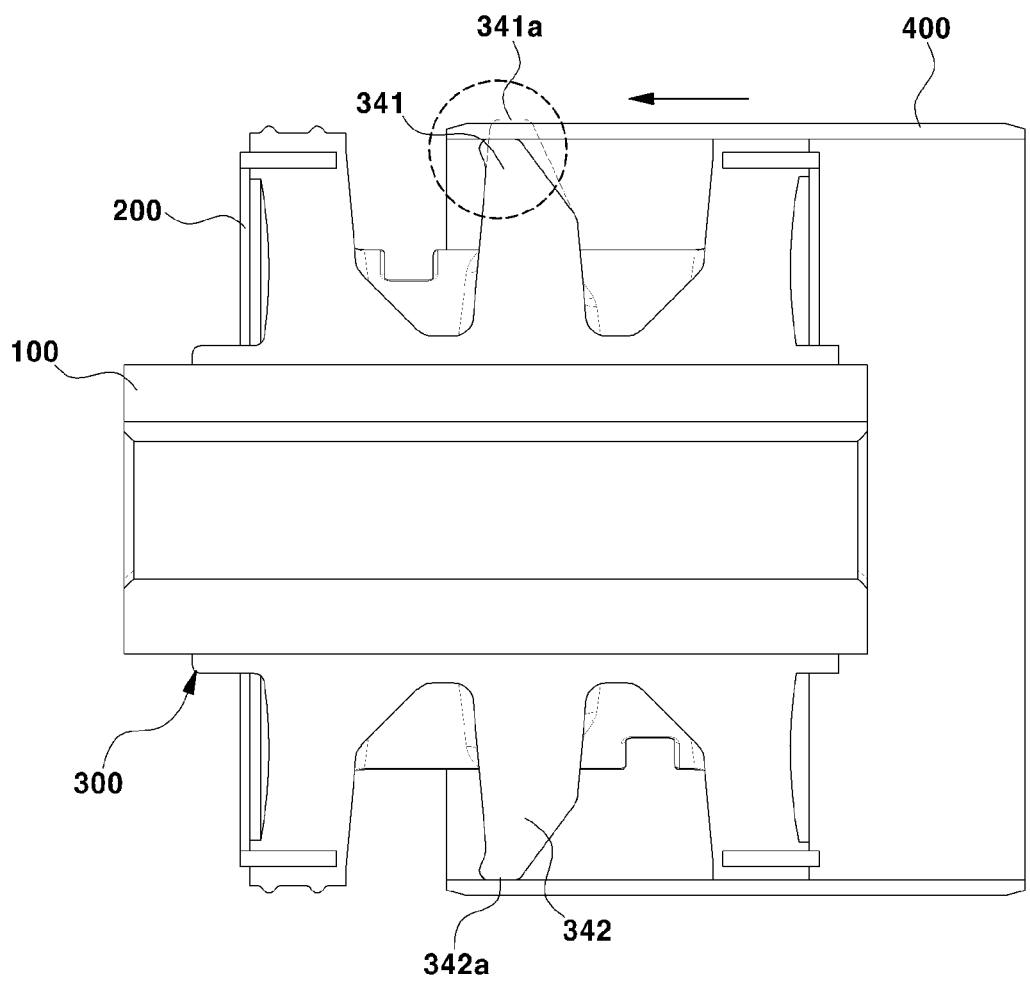

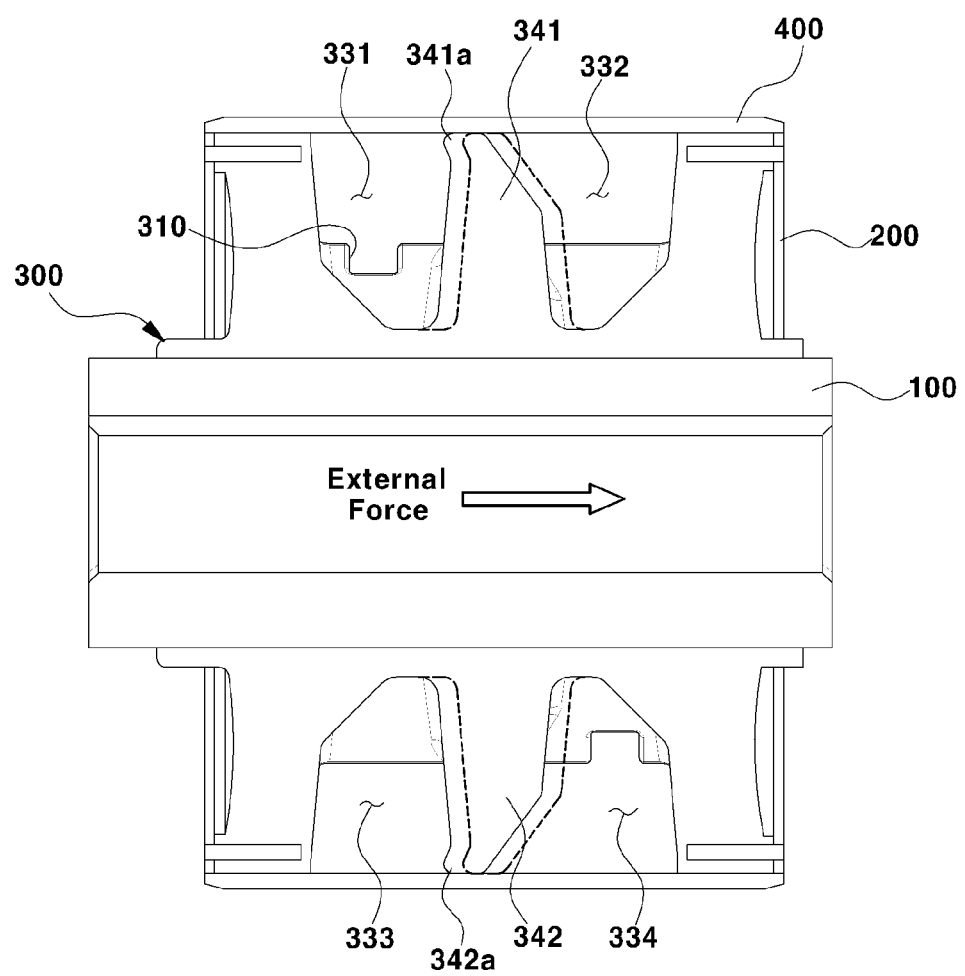

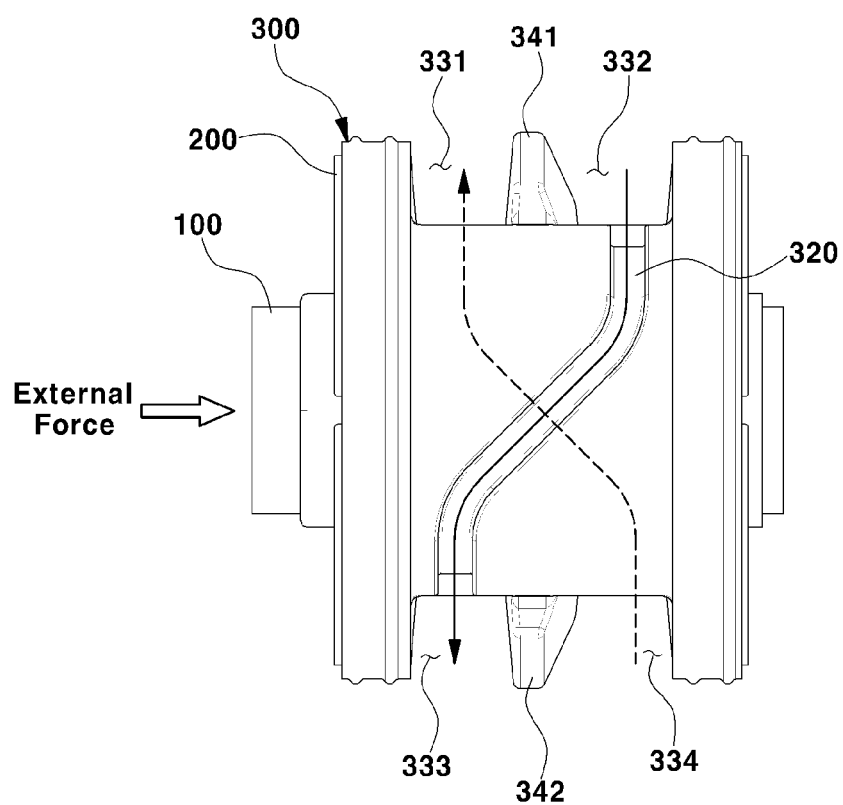

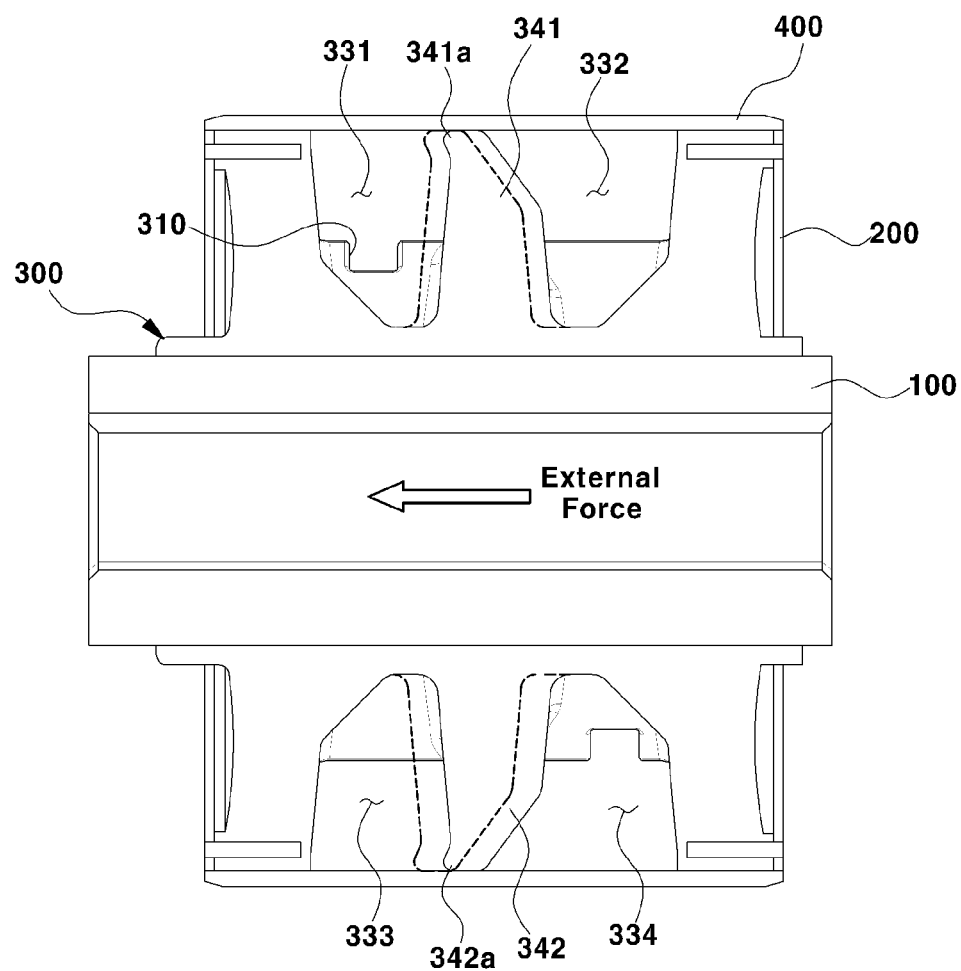

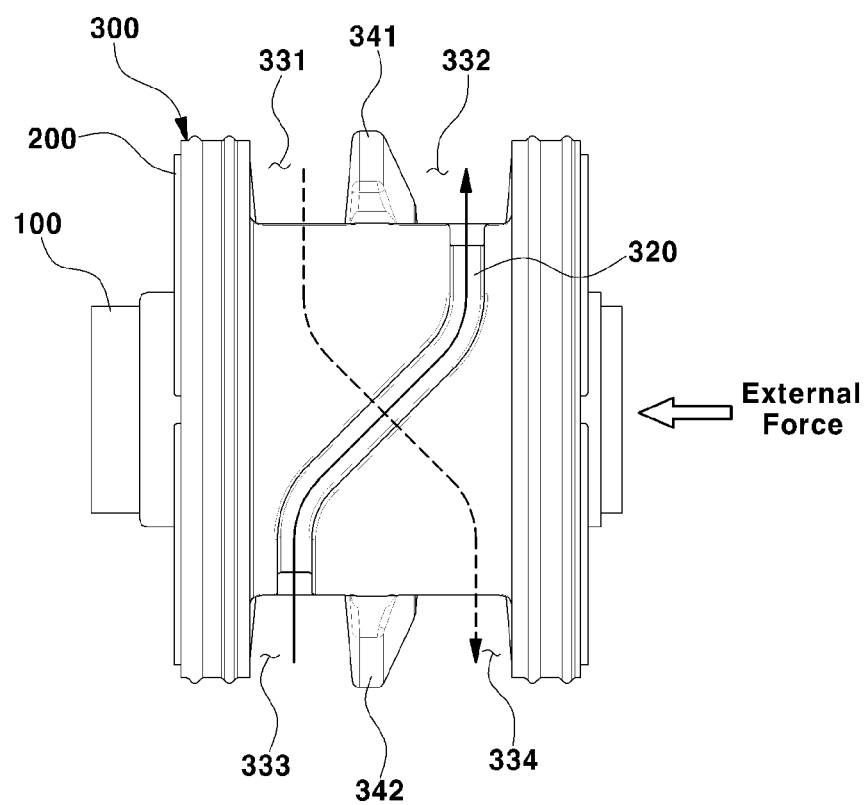

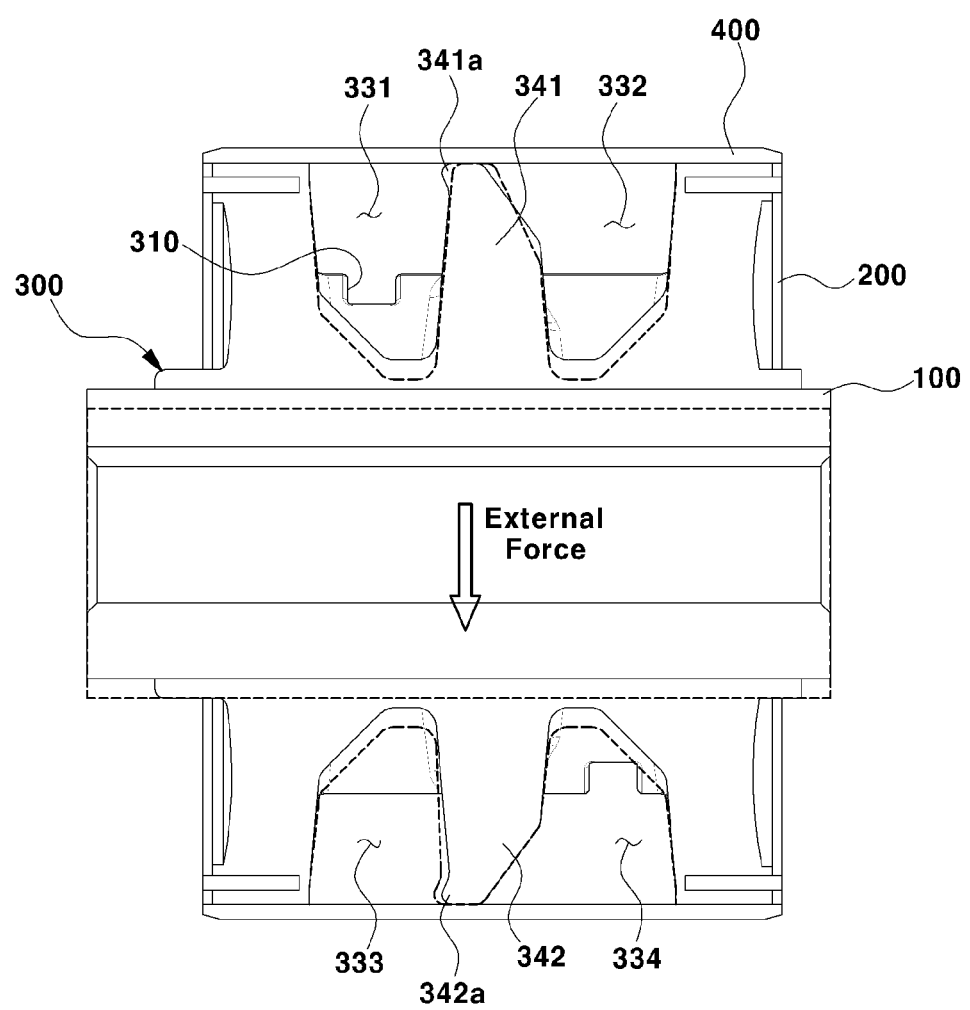

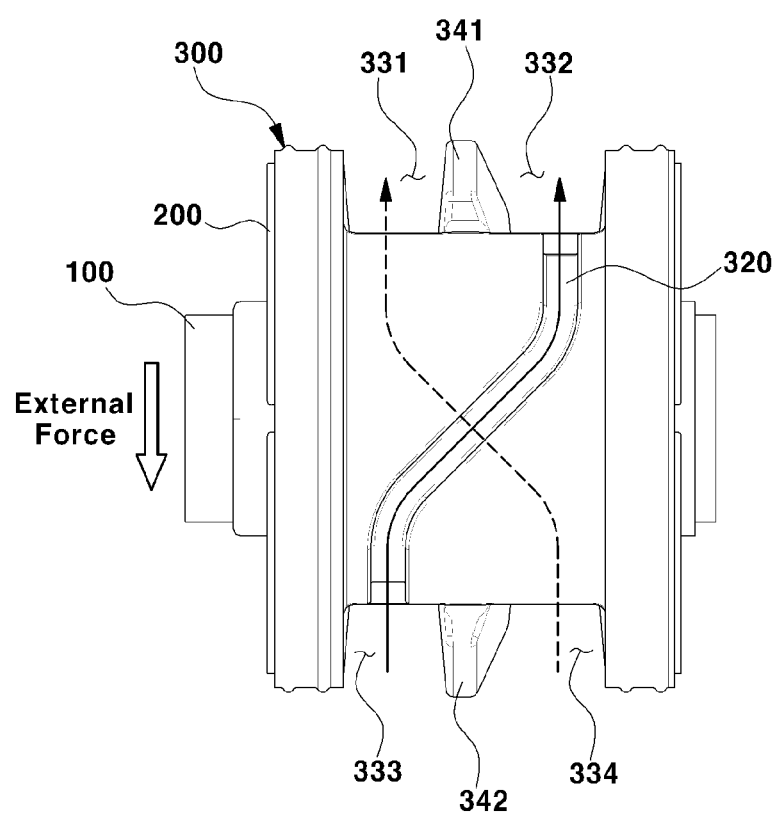

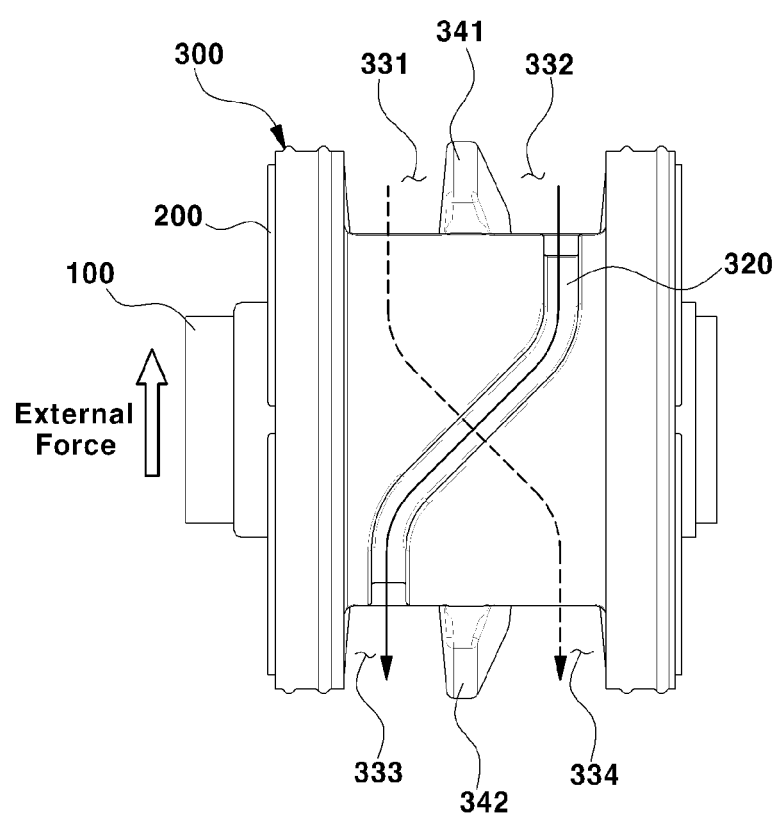

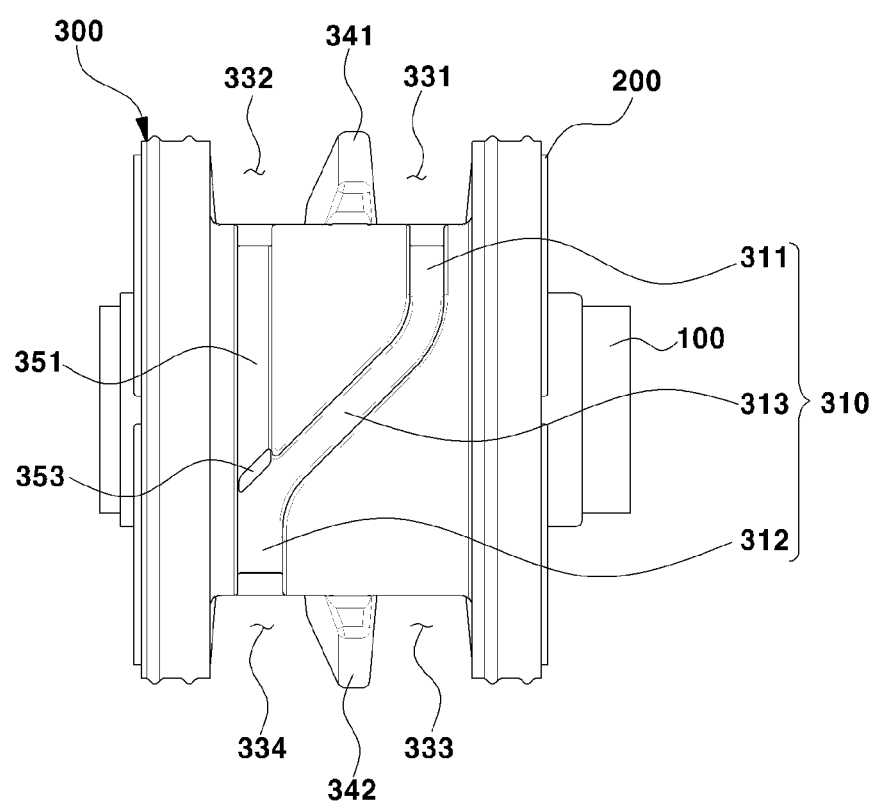

HYDRAULIC MOUNT FOR VEHICLE

CROSS REFERENCE TO RELATED APPLICATION

The present application claims under 35 U.S.C. § 119(a) the benefit of Korean Patent Application No. 10-2021-0030659, filed on Mar. 9, 2021, the entire contents of which are incorporated herein by reference.

BACKGROUND

(a) Technical Field

The present disclosure relates to a hydraulic mount for a vehicle, more particularly, to the hydraulic mount configured to control and damp the behavior of a motor mounted on the vehicle.

(b) Description of the Related Art

Recently, research and development of electric vehicles has continued because of the eco-friendly nature of these vehicles. Such electric vehicles are driven by a motor instead of an engine, and the motor is supplied with power from a rechargeable battery.

Electric vehicles generally use a bush-type rubber mount instead of a hydraulic mount, since the weight of a motor module including a motor and power electronics is lower than the weight of a conventional engine.

However, since the bush-type rubber mount has significantly-low axial characteristics due to limitations in the shape thereof, axial behavior of the motor module is increased. Thus, in the determination of positions of rubber mounts to mount the motor module on a vehicle, a design is made such that rubber mounts are misaligned from each other about respective axial directions thereof.

However, when the motor module is mounted on a vehicle based on a three-point mount design, the behavior of the motor module may be increased, since the arrangement of the rubber mounts is determined to be disadvantageous to damping of axial behavior of the motor module. Thus, there is a problem that aftershock may increase during traveling on a bumpy road.

In addition, during traveling, a typical gasoline vehicle has vertical behavior in a front portion thereof, in which the engine is disposed. In contrast, an electric vehicle has vertical behavior in both the front and rear portion during traveling, since solid bodies of motor modules are mounted on front and rear wheel sides.

Thus, the electric vehicle may suffer from severe shaking vibration during traveling on a level road, which is problematic.

The foregoing is intended merely to aid in the understanding of the background of the present disclosure, and is not intended to mean that the present disclosure falls within the purview of the related art that is already known to those skilled in the art.

SUMMARY

Accordingly, the present disclosure proposes a hydraulic mount having improved damping characteristics in axial and vertical directions.

According to the present disclosure, a hydraulic mount is provided for a vehicle. The hydraulic mount may include: an inner pipe; a main rubber molded on an outer circumferential surface of the inner pipe and including an upper front liquid chamber and an upper rear liquid chamber disposed on upper portions of the main rubber and in a front-back direction, and a lower front liquid chamber and a lower rear liquid chamber disposed on lower portions of the main rubber and in a front-back direction; and an outer pipe fitted to an outer circumferential surface of the main rubber to seal the liquid chambers. The main rubber may include: a first flow path connecting the upper front liquid chamber and the lower rear liquid chamber filled with fluid such that the fluid is movable therebetween; and a second flow path connecting the upper rear liquid chamber and the lower front liquid chamber filled with fluid such that the fluid is movable therebetween.

The first flow path may be disposed between the upper front liquid chamber and the lower rear liquid chamber, the second flow path may be disposed between the upper rear liquid chamber and the lower front liquid chamber, and the first flow path and the second flow path may extend diagonally with respect to an axial direction of the main rubber.

The upper front liquid chamber and the lower rear liquid chamber may be disposed on different circumferences of the main rubber, and the upper rear liquid chamber and the lower front liquid chamber may be disposed on different circumferences of the main rubber.

The upper front liquid chamber and the lower front liquid chamber may be disposed on the same circumference of the main rubber, and the upper rear liquid chamber and the lower rear liquid chamber may be disposed on the same circumference of the main rubber.

The upper front liquid chamber may be disposed in front of the upper rear liquid chamber, and the lower front liquid chamber may be disposed in front of the lower rear liquid chamber.

The main rubber may include: an upper intermediate bridge disposed between the upper front liquid chamber and the upper rear liquid chamber to divide the upper front liquid chamber and the upper rear liquid chamber; and a lower intermediate bridge disposed between the lower front liquid chamber and the lower rear liquid chamber to divide the lower front liquid chamber and the lower rear liquid chamber.

The upper intermediate bridge may divide the upper front liquid chamber and the upper rear liquid chamber while being in contact with the outer pipe, and the lower intermediate bridge may divide the lower front liquid chamber and the lower rear liquid chamber while being in contact with the outer pipe.

The upper intermediate bridge may be in contact with the outer pipe and has a curved outer end, and the outer end thereof may slide while being in contact with the outer pipe, in response to axial external force being applied to the inner pipe. The lower intermediate bridge may be in contact with the outer pipe and has a curved outer end, and the outer end thereof may slide while being in contact with the outer pipe, in response to axial external force being applied to the inner pipe.

The outer end of the upper intermediate bridge may be straightened or further curved to remain in contact with the outer pipe in response to vertical external force being applied to the inner pipe. The outer end of the lower intermediate bridge may be straightened or further curved to remain in contact with the outer pipe in response to vertical external force being applied to the inner pipe.

When the outer end of the upper intermediate bridge is straightened, the outer end of the lower intermediate bridge may be further curved. When the outer end of the upper intermediate bridge is further curved, the outer end of the lower intermediate bridge may be straightened.

The upper intermediate bridge may be tapered outward in a radial direction of the main rubber while being biased in one direction with respect to an axial direction, and the lower intermediate bridge may be tapered outward in the radial direction of the main rubber while being biased in one direction with respect to an axial direction.

The hydraulic mount may further include an intermediate bridge disposed coaxially with the inner pipe. The main rubber may be molded from an outer circumferential surface of the inner pipe to an outer circumferential surface of the outer pipe to cover an outer circumferential surface of the intermediate pipe. Each of the first flow path and the second flow path may include a recess provided on the outer circumferential surface of the main rubber and is sealed by the outer pipe.

The intermediate pipe may include an upper open area and a lower open area, the upper intermediate bridge may be in contact with the outer pipe through the upper open area, and the lower intermediate bridge may be in contact with the outer pipe through the lower open area.

The intermediate pipe may include: a front stepped portion disposed in front of the upper open area and the lower open area and stepped with respect to a central portion of the intermediate pipe; and a rear stepped portion disposed at the rear of the upper open area and the lower open area and stepped with respect to the central portion of the intermediate pipe.

The main rubber may include: an upper front bridge adjacent to the upper front liquid chamber and fixed to the front stepped portion of the intermediate pipe; an upper rear bridge adjacent to the upper rear liquid chamber and fixed to the rear stepped portion of the intermediate pipe; a lower front bridge adjacent to the lower front liquid chamber and fixed to the front stepped portion of the intermediate pipe; and a lower rear bridge adjacent to the lower rear liquid chamber and fixed to the rear stepped portion of the intermediate pipe.

The first flow path may include: a first upper flow path adjacent to the upper front liquid chamber and extending radially; a first lower flow path adjacent to the lower rear liquid chamber and extending radially; and a first intermediate flow path disposed between the first upper flow path and the first lower flow path to connect the first upper flow path and the first lower flow path and extending diagonally with respect to an axial direction of the main rubber.

The second flow path may include: a second upper flow path adjacent to the upper rear liquid chamber and extending radially; a second lower flow path adjacent to the lower front liquid chamber and extending radially; and a second intermediate flow path disposed between the second upper flow path and the second lower flow path to connect the second upper flow path and the second lower flow path and extending diagonally with respect to the axial direction of the main rubber.

The main rubber may include: a first bypass flow path connecting the upper rear liquid chamber and the first flow path such that fluid is movable therebetween; a second bypass flow path connecting the upper front liquid chamber and the second flow path such that fluid is movable therebetween; a first rubber film disposed in the first bypass flow path to block a flow of fluid between the first bypass flow path and the first flow path and configured to allow fluid to pass therethrough when the first rubber film is selectively folded toward the first bypass flow path by a pressure of fluid occurring in the first flow path; and a second rubber film disposed in the second bypass flow path to block a flow of fluid between the second bypass flow path and the second flow path and configured to allow fluid to pass therethrough when the second rubber film is selectively folded toward the second bypass flow path by a pressure of fluid occurring in the second bypass flow path.

The first bypass flow path may connect the first lower flow path and the upper rear liquid chamber such that fluid is movable therebetween and extends in a circumferential direction of the main rubber. The second bypass flow path may connect the second lower flow path and the upper front liquid chamber such that fluid is movable therebetween and extends in the circumferential direction of the main rubber.

The hydraulic mount may further include an intermediate plate on the outer circumferential surface of the inner pipe, wherein the intermediate plate includes an upper intermediate plate disposed within an upper intermediate bridge and a lower intermediate plate disposed within a lower intermediate bridge.

According to embodiments of the present disclosure, the following main effects may be provided.

First, the axial damping characteristics may be improved, and thus, the axial behavior of the motor module may be controlled, thereby reducing aftershock resulting from the axial behavior of the motor module.

Second, the vertical damping characteristics may be improved, thereby reducing shaking vibration continuously applied during traveling on a level road.

BRIEF DESCRIPTION OF THE DRAWINGS

The above and other objectives, features, and other advantages of the present disclosure will be more clearly understood from the following detailed description when taken in conjunction with the accompanying drawings, in which:

FIGS. 3A and 3B are views illustrating the hydraulic mount according to the embodiment of the present disclosure, from which the outer pipe is omitted;

FIG. 6 is a view illustrating a portion of the process of fabricating the hydraulic mount according to the embodiment of the present disclosure;

FIGS. 7A to 8B are views illustrating an operating state of the hydraulic mount according to the embodiment of the present disclosure when axial external force is applied thereto;

FIGS. 9A and 9B are views illustrating an operating state of the hydraulic mount according to the embodiment of the present disclosure when downward external force is applied thereto;

FIGS. 10A and 10B are views illustrating an operating state of the hydraulic mount according to the embodiment of the present disclosure when upward external force is applied thereto;

FIGS. 11 and 12 are views illustrating a hydraulic mount according to another embodiment of the present disclosure, from which an outer pipe is omitted;

DETAILED DESCRIPTION OF THE DISCLOSURE

Figure 1:
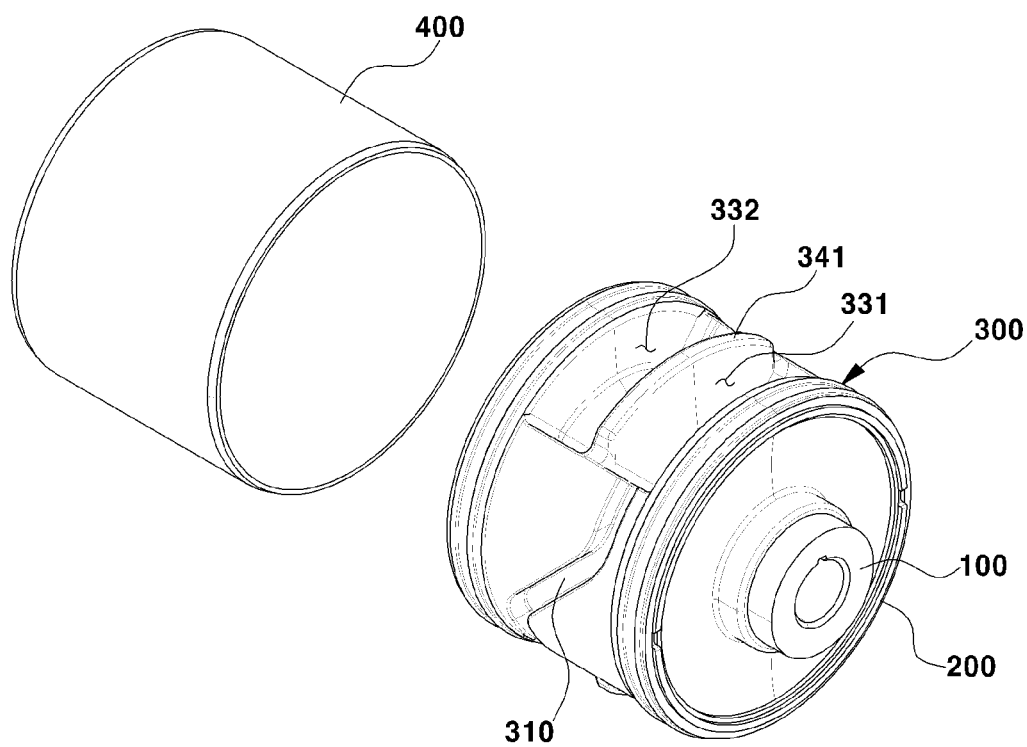
FIG. 1 is an exploded perspective view illustrating a hydraulic mount according to an embodiment of the present disclosure.
Figure 2A:
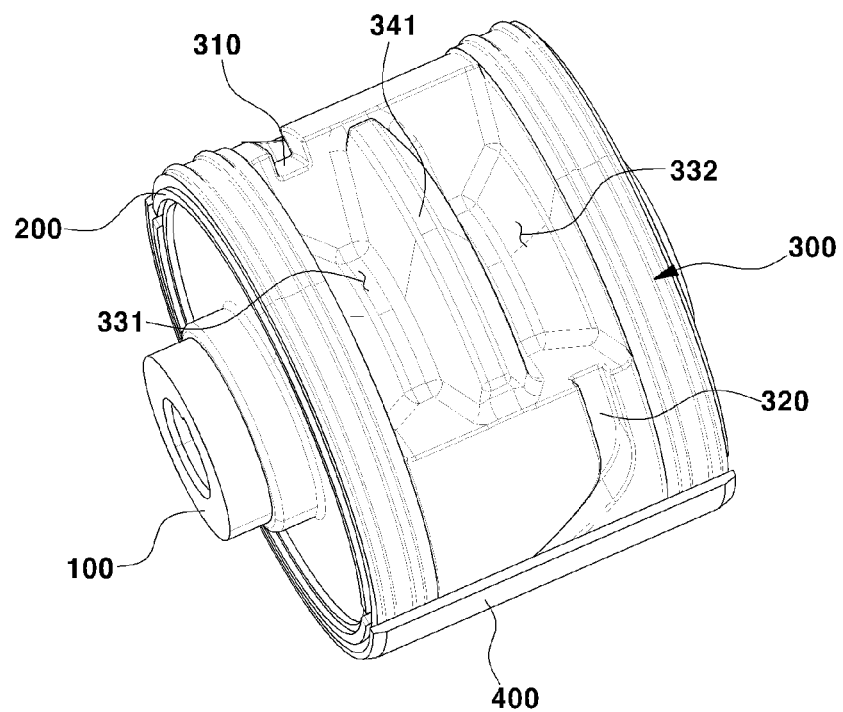
FIGS. 2A and 2B are partially cut-away perspective views illustrating the hydraulic mount according to the embodiment of the present disclosure.
Figure 2B:
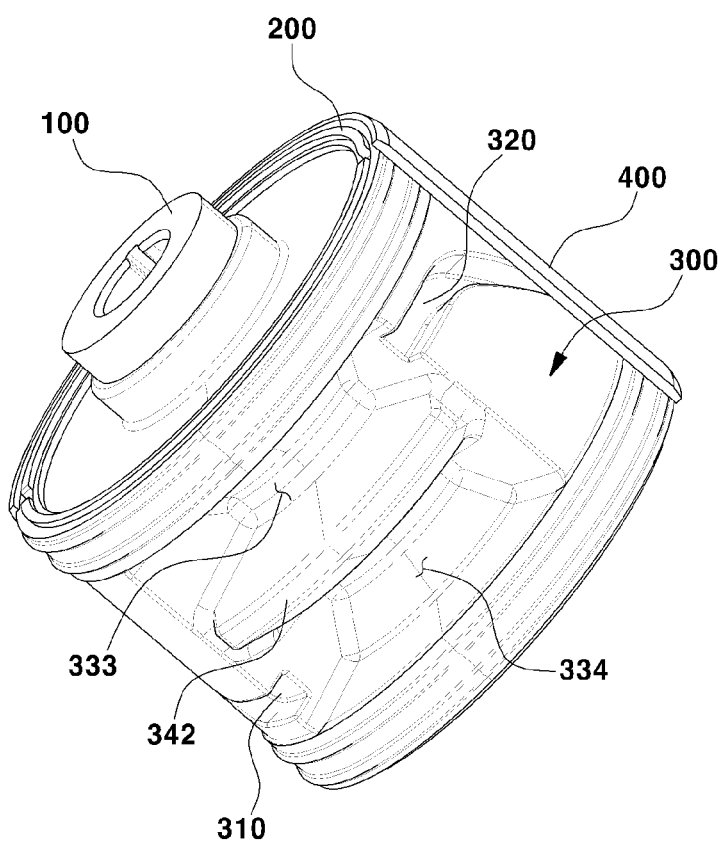

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described with reference to the accompanying drawings. Illustrations in the accompanying drawings are provided to assist in the understanding of embodiments of the present disclosure and may differ from actually-implemented forms.

In addition, it will be understood that when an element is referred to as being "connected" or "joined" to another element, not only can it be "directly connected or joined" to the other element, but it can also be "indirectly connected or joined" to the other element via an intervening element. In contrast, when an element is referred to as being "directly connected" or "directly joined" to another element, it should be understood that there is no intervening element. Other expressions describing the relationships between elements, such as "between", "directly between", "adjacent to", and "directly adjacent to", should be understood in the same manner.

Figure 18:
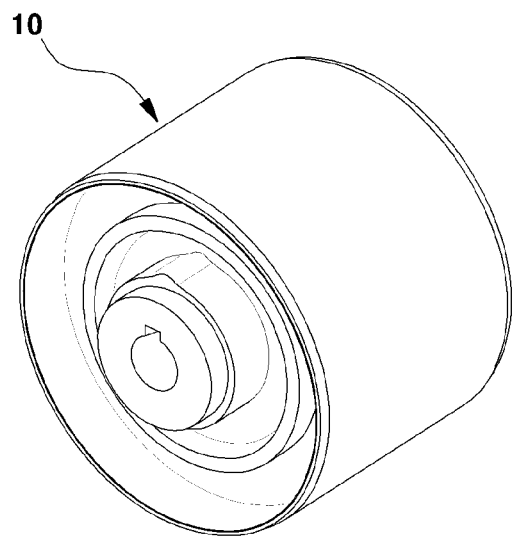
FIGS. 18 and 19 (RELATED ART) are views illustrating a bush-type rubber mount of the related art.
Figure 19:
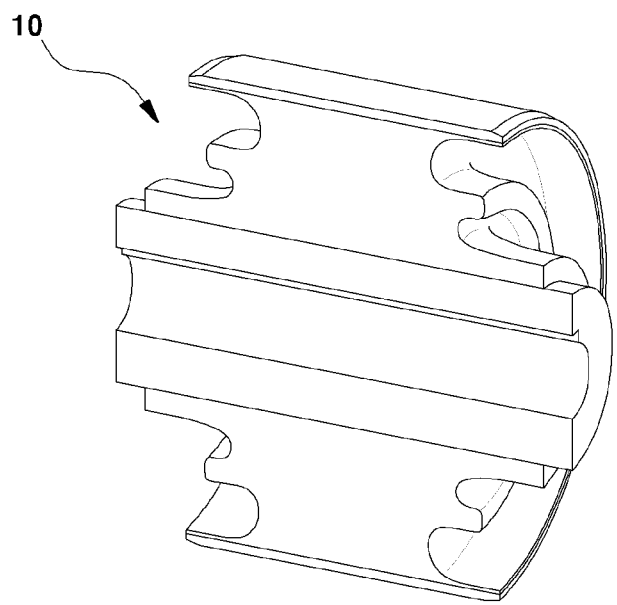

FIGS. 18 and 19 (RELATED ART) are views illustrating a bush-type rubber mount of the related art.

A motor module is a device that generates driving power in an electric vehicle. A motor module of the related art is generally mounted on a vehicle using a bush-type rubber mount 10 as illustrated in FIGS. 18 and 19.

When the motor module is mounted on a vehicle body based on a three-point support design, a front central portion, a rear left portion, and a rear right portion of the motor module may be attached to the vehicle body through rubber mounts. Among the rubber mounts, the rubber mount mounted on the front central portion of the motor module is disposed such that an axial direction thereof is parallel to a front-rear direction of the vehicle, and the rubber mounts mounted on the rear left portion and the rear right portion of the motor module are disposed such that axial directions thereof are parallel to a transverse direction of the vehicle.

However, axial characteristics of the rubber mount are inferior to either transverse characteristics thereof or vertical characteristics (i.e. the characteristics in the top-bottom direction) thereof. Thus, when the rubber mount is mounted on the vehicle body based on the three-point support design as described above, aftershock occurring during traveling on a bumpy road or the like may be increased, which is problematic. Since this problem results from the shape of the rubber mount, improvements in the axial characteristics of the rubber mount are limited.

In addition, an electric vehicle has the problem of severe shaking vibration during traveling on a level road, since the motor modules are mounted on the front and rear wheel sides.

The present disclosure provides a bush-type hydraulic mount having improved characteristics in the both an axial direction and a load-bearing direction in order to overcome the above-described problems.

The hydraulic mount has a structure able to improve the damping characteristics in the axial direction and the load-bearing direction thereof. When the hydraulic mount is disposed such that the axial direction thereof is parallel to the front-rear direction of the vehicle, the hydraulic mount may effectively damp vibration in both the front-rear direction and the vertical direction (i.e. the top-bottom direction) of the vehicle.

In this regard, as illustrated in FIGS. 1 to 5, the hydraulic mount may include an inner pipe 100, an intermediate pipe 200 disposed coaxially with the inner pipe 100, a main rubber 300, and an outer pipe 400.

Hereinafter, unless otherwise stated, the term "axial direction" may refer to the axial direction of the hydraulic mount including the inner pipe 100 and the like and may be interpreted as having the same meaning as the front-rear direction or the front rear direction of the vehicle. In addition, unless otherwise stated, the term "vertical direction" may refer to either the vertical direction of the vehicle or the load-bearing direction of the hydraulic mount. The load-bearing direction is a direction in which the load of a component attached to the vehicle body through the hydraulic mount is supported. In addition, unless otherwise stated, the term "radial direction" may refer to the radial direction of the hydraulic mount including the inner pipe 100 and the like.

Figure 4A:
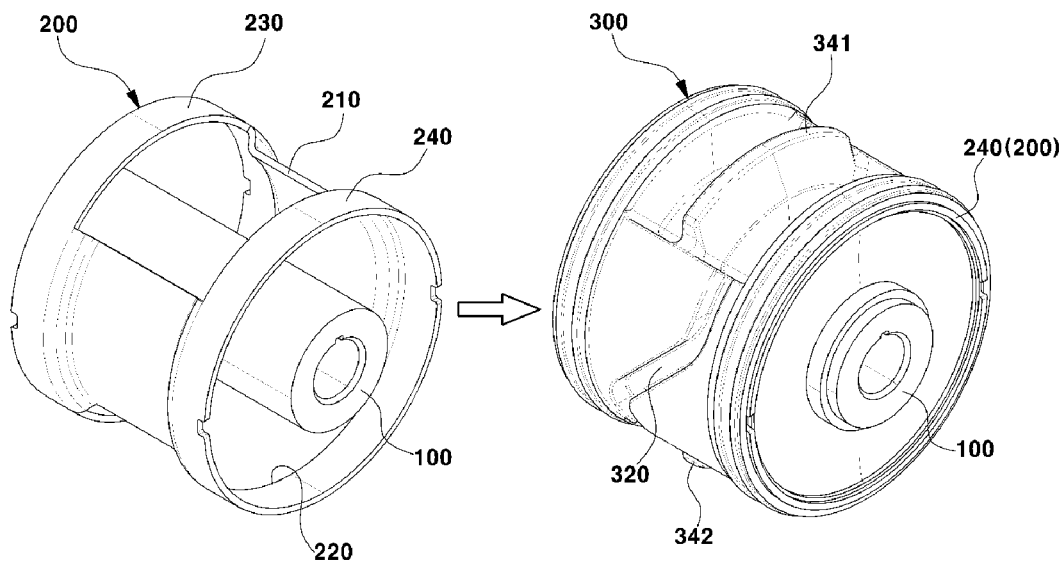
FIGS. 4A and 4B are views illustrating portions of a process of fabricating the hydraulic mount according to the embodiment of the present disclosure.

As illustrated in FIG. 4A, the inner pipe 100 is configured to be coupled to a component, such as the motor module, mounted on the vehicle body. The inner pipe 100 has the shape of a hollow cylinder, and may be made from a metal material.

The motor module includes a motor that generates driving force of an electric vehicle and power electronics (PE) configured to supply electric power to the motor.

The inner pipe 100 may be coupled to the motor module through a fastening member, and may transfer the load of the motor module to the main rubber 300.

Figure 4B:
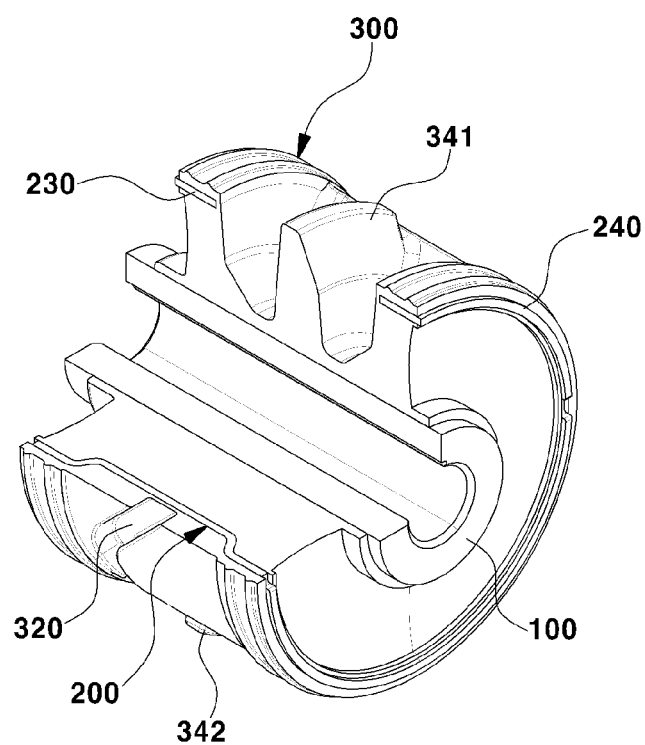

As illustrated in FIGS. 4A and 4B, the intermediate pipe 200 is disposed outside and coaxially with the inner pipe 100. The intermediate pipe 200 has the shape of a hollow cylinder, and may be made of a metal material. The intermediate pipe 200 has an upper open portion 210, a lower open portion 220, a front stepped portion 230, and a rear stepped portion 240.

The upper open portion 210 is provided on the top portion of the intermediate pipe 200, while the lower open portion 220 is provided on the bottom portion of the intermediate pipe 200. The upper open portion 210 and the lower open portion 220 may be provided symmetrically with respect to the inner pipe 100.

The front stepped portion 230 is disposed adjacent to the upper open portion 210 and the lower open portion 220 to be in front thereof with respect to the axial direction, and extends without interruption in the radial direction of the intermediate pipe 200. For example, the front stepped portion 230 may extend in the shape of a ring.

The rear stepped portion 240 is disposed adjacent to the upper open portion 210 and the lower open portion 220 to be at the rear thereof with respect to the axial direction, extends without interruption in the radial direction of the intermediate pipe 200, and is disposed at the rear of the front stepped portion 230.

The front stepped portion 230 and the rear stepped portion 240 are disposed on the front portion and the rear portion of the intermediate pipe 200, respectively, with respect to the axial direction. The front stepped portion 230 and the rear stepped portion 240 protrude outward in the radial direction beyond the central portion of the intermediate pipe 200 in which the upper open portion 210 and the lower open portion 220 are disposed.

That is, the front stepped portion 230 and the rear stepped portion 240 are stepped from the central portion of the intermediate pipe 200. This is intended to provide a disposition space outside the central portion of the intermediate pipe 200, the disposition space allowing a first flow path 310 and a second flow path 320 of the main rubber 300 to be disposed therein.

The main rubber 300 is disposed on the outer circumferential surface of the inner pipe 100 by vulcanization molding. Specifically, the main rubber 300 is fixed between the inner pipe 100 and the intermediate pipe 200 by molding, and is molded from the outer circumferential surface of the inner pipe 100 to the outer circumferential surface of the intermediate pipe 200. The main rubber 300 is molded to cover the outer circumferential surface of the intermediate pipe 200 and is molded to surround the intermediate pipe 200.

The main rubber 300 includes a pair of liquid chambers 331 and 332 disposed on the upper portions of the main rubber 300 and in a front-rear direction, and a pair of liquid chambers 333 and 334 disposed on the lower portions of the main rubber 300 and in a front-rear direction.

The pair of liquid chambers 331 and 332 disposed on the upper portion of the main rubber 300 includes the upper front liquid chamber 331 and the upper rear liquid chamber 332. The pair of liquid chambers 333 and 334 disposed on the lower portion of the main rubber 300 includes the lower front liquid chamber 333 and the lower rear liquid chamber 334.

Each of the liquid chambers 331, 332, 333, and 334 may have the shape a recess formed on the outer circumferential surface of the main rubber 300. Fluid for damping vibration transferred through the inner pipe 100 is contained in each of the liquid chambers 331, 332, 333, and 334 in a sealed manner. Since the outer pipe 400 is press-fitted to the outer circumferential surface of the main rubber 300 while being immersed in the fluid, each of the liquid chambers 331, 332, 333, and 334 may be filled with the fluid.

In addition, each of the liquid chambers 331, 332, 333, and 334 is tightly closed by the outer pipe 400 in response to the outer pipe 400 being press-fitted to an outer portion of the main rubber 300.

The upper front liquid chamber 331 and the upper rear liquid chamber 332 are disposed in the axial direction of the main rubber 300 and in the front-back direction. Specifically, the upper front liquid chamber 331 is disposed in front of the upper rear liquid chamber 332.

The lower front liquid chamber 333 and the lower rear liquid chamber 334 are disposed in the axial direction of the main rubber 300 and in the front-back direction. Here, the lower front liquid chamber 333 is disposed in front of the lower rear liquid chamber 334.

In addition, the upper front liquid chamber 331 and the lower front liquid chamber 333 are disposed on the same circumference of the main rubber 300 while being spaced apart a predetermined distance from each other. The upper rear liquid chamber 332 and the lower rear liquid chamber 334 are disposed on the same circumference of the main rubber 300 while being spaced apart a predetermined distance from each other.

Here, the upper front liquid chamber 331 and the lower rear liquid chamber 334 are disposed on different circumferences of the main rubber 300, and the upper rear liquid chamber 332 and the lower front liquid chamber 333 are also disposed on different circumferences of the main rubber 300.

In addition, the main rubber 300 includes the first flow path 310 connecting the upper front liquid chamber 331 and the lower rear liquid chamber 334 such that fluid is movable therethrough and the second flow path 320 connecting the upper rear liquid chamber 332 and the lower front liquid chamber 333 such that fluid is movable therethrough.

The first flow path 310 may have the shape of a recess formed on the outer circumferential surface of the main rubber 300, and may be disposed between the upper front liquid chamber 331 and the lower rear liquid chamber 334. For example, the first flow path 310 may be disposed on the right portion of the main rubber 300.

The second flow path 320 may have the shape of a recess formed on the outer circumferential surface of the main rubber 300, and may be disposed between the upper rear liquid chamber 332 and the lower front liquid chamber 333. For example, the second flow path 320 may be disposed on the left portion of main rubber 300.

Here, one longitudinal end of the first flow path 310 is directly connected to the upper front liquid chamber 331, and the other longitudinal end of the first flow path 310 is directly connected to the lower rear liquid chamber 334. In addition, one longitudinal end of the second flow path 320 is directly connected to the upper rear liquid chamber 332, and the other longitudinal end of the second flow path 320 is directly connected to the lower front liquid chamber 333.

The first flow path 310 may be formed on the right portion of the outer circumferential surface of the main rubber 300 so as to diagonally extend, and the second flow path 320 may be formed on the left portion of the outer circumferential surface of the main rubber 300 so as to diagonally extend. Here, the first flow path 310 and the second flow path 320 may be disposed to extend diagonally with respect to the axial direction of the main rubber 300.

As illustrated in FIGS. 3A and 3B, the first flow path 310 may include a first upper flow path 311, a first lower flow path 312, and a first intermediate flow path 313. The first upper flow path 311 extends in the circumferential direction while being adjacent to the upper front liquid chamber 331, the first lower flow path 312 extends in the circumferential direction while being adjacent to the lower rear liquid chamber 334, and the first intermediate flow path 313 is disposed between the first upper flow path 311 and the first lower flow path 312 to connect the first upper flow path 311 and the first lower flow path 312. The first upper flow path 311 and the first lower flow path 312 extend perpendicularly to the axial direction, and the first intermediate flow path 313 extends diagonally with respect to the axial direction.

The second flow path 320 may include a second upper flow path 321, a second lower flow path 322, and a second intermediate flow path 323. The second upper flow path 321 extends in the circumferential direction while being adjacent to the upper rear liquid chamber 332, the second lower flow path 322 extends in the circumferential direction while being adjacent to the lower front liquid chamber 333, and the second intermediate flow path 323 is disposed between the second upper flow path 321 and the second lower flow path 322 to connect the second upper flow path 321 and the second lower flow path 322. Here, the second upper flow path 321 and the second lower flow path 322 extend perpendicularly to the axial direction, and the second intermediate flow path 323 extends diagonally with respect to the axial direction.

In addition, the main rubber 300 includes an upper intermediate bridge 341 and a lower intermediate bridge 342, each of which is deformable by external force.

The upper intermediate bridge 341 is disposed between the upper front liquid chamber 331 and the upper rear liquid chamber 332 to divide the upper front liquid chamber 331 and the upper rear liquid chamber 332. The lower intermediate bridge 342 is disposed between the lower front liquid chamber 333 and the lower rear liquid chamber 334 to divide the lower front liquid chamber 333 and the lower rear liquid chamber 334.

The upper intermediate bridge 341 may divide the upper front liquid chamber 331 and the upper rear liquid chamber 332 as separate liquid chambers, respectively, and the lower intermediate bridge 342 may divide the lower front liquid chamber 333 and the lower rear liquid chamber 334 separate liquid chambers, respectively.

The upper intermediate bridge 341 and the lower intermediate bridge 342 are configured to protrude further outward in the radial direction than the front stepped portion 230 and the rear stepped portion 240 of the intermediate pipe 200 when the main rubber 300 is formed on the outer circumferential surface of the inner pipe 100.

Specifically, the upper intermediate bridge 341 and the lower intermediate bridge 342 extend through the intermediate pipe 200 and are bent in one direction while being in contact with the outer pipe 400. Here, the upper intermediate bridge 341 extends through the upper open portion 210 of the intermediate pipe 200 to be in contact with the inner circumferential surface of the outer pipe 400. The lower intermediate bridge 342 extends through the lower open portion 220 of the intermediate pipe 200 to be in contact with the inner circumferential surface of the outer pipe 400.

The upper intermediate bridge 341 divides the upper front liquid chamber 331 and the upper rear liquid chamber 332 while being in contact with the outer pipe 400. The lower intermediate bridge 342 divides the lower front liquid chamber 333 and the lower rear liquid chamber 334 while being in contact with the outer pipe 400.

The outer pipe 400 may be press-fitted to an outer portion of the main rubber 300 by interference fitting, and is configured to surround the main rubber 300 and the intermediate pipe 200. The outer pipe 400 may be in close contact with the outer circumferential surface of the main rubber 300 and may have the shape of a cylinder. The outer pipe 400 may be coupled to a vehicle body. For example, the outer pipe 400 may be fixedly coupled to the vehicle body through a bracket or the like mounted on a portion of the vehicle body.

Figure 5:
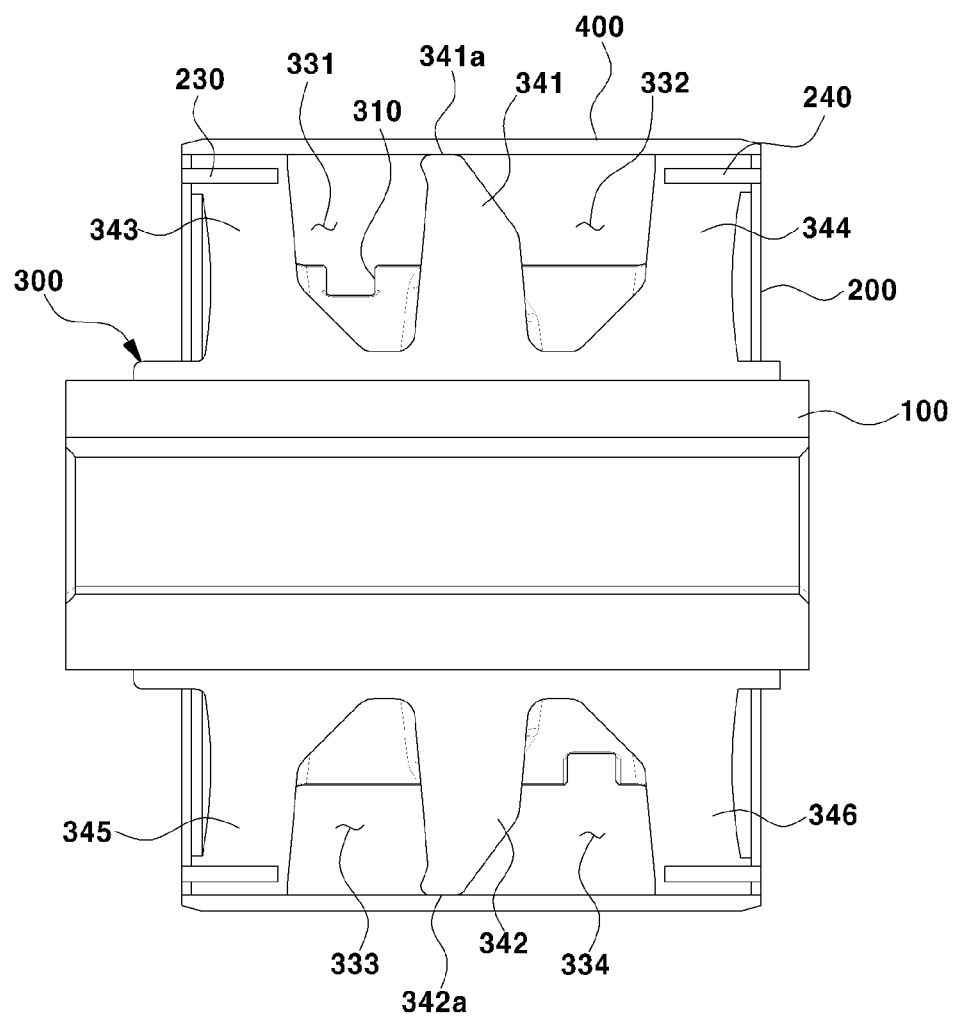
FIG. 5 is a cross-sectional view illustrating the hydraulic mount according to the embodiment of the present disclosure.

As illustrated in FIG. 5, the outer end of the upper intermediate bridge 341 and the outer end of the lower intermediate bridge 342 are in contact with the inner circumferential surface of the outer pipe 400. Specifically, the outer end of the upper intermediate bridge 341 in the radial direction is in contact with the upper portion of the inner circumferential surface of the outer pipe 400, and the outer end of the lower intermediate bridge 342 in the radial direction is in contact with the lower portion of the inner circumferential surface of the outer pipe 400.

The outer end of the upper intermediate bridge 341 may be referred to as an upper contact portion 341a, while the outer end of the lower intermediate bridge 342 may be referred to as a lower contact portion 342a. In other words, the upper intermediate bridge 341 may have the upper contact portion 341a on the outer end with respect to the radial direction, while the lower intermediate bridge 342 may have the lower contact portion 342a on the outer end with respect to the radial direction.

The upper contact portion 341a and the lower contact portion 342a are in contact with the inner circumferential surface of the outer pipe 400 while being curved in one direction (e.g. to the front) with respect to the axial direction. The upper contact portion 341a and the lower contact portion 342a may be moved or deformed in the front-rear direction by external force.

As illustrated in FIGS. 7A to 8B, when axial outer force is applied to the inner pipe 100, the upper contact portion 341a and the lower contact portion 342a slide in the axial direction while being in contact with the outer pipe 400. When the upper contact portion 341a and the lower contact portion 342a are caused to slide in the axial direction by the outer force, the volumes of the liquid chambers 331, 332, 333, and 334 are changed, thereby causing fluid to move through the first flow path 310 and the second flow path 320.

In other words, when the axial outer force is applied to the inner pipe 100, the intermediate bridges 341 and 342 slip on the inner circumferential surface of the outer pipe 400, thereby changing the volumes of the liquid chambers 331, 332, 333, and 334. Thus, it is possible to control the axial behavior of the motor module and damp the vibration of the motor module, based on changes in the volumes of the liquid chambers 331, 332, 333, and 334.

When the inner pipe 100 is caused to move backward by the external force, the upper contact portion 341a and the lower contact portion 342a slide backward while being in contact with the inner circumferential surface of the outer pipe 400. In contrast, when the inner pipe 100 is caused to move forward by the external force, the upper contact portion 341a and the lower contact portion 342a slide forward while being in contact with the inner circumferential surface of the outer pipe 400.

When the contact portions 341a and 342a slide backward, the volumes of the upper front liquid chamber 331 and the lower front liquid chamber 333 are increased, and the volumes of the upper rear liquid chamber 332 and the lower rear liquid chamber 334 are reduced. In contrast, when the contact portions 341a and 342a slide forward, the volumes of the upper front liquid chamber 331 and the lower front liquid chamber 333 are reduced, and the volumes of the upper rear liquid chamber 332 and the lower rear liquid chamber 334 are increased.

The fluid occupying each of the liquid chambers 331, 332, 333, and 334 has a low coefficient of friction, since the fluid is an oil component. Thus, the contact portions 341a and 342a may slide on the surface of the outer pipe 400 without friction.

In addition, when the contact portions 341a and 342a slide backward, as illustrated in FIG. 7B, the fluid in the lower rear liquid chamber 334 moves to the upper front liquid chamber 331 through the first flow path 310, and the fluid in the upper rear liquid chamber 332 moves to the lower front liquid chamber 333 through the second flow path 320.

In contrast, when the contact portions 341a and 342a slide forward, as illustrated in FIG. 8B, the fluid in the upper front liquid chamber 331 moves to the lower rear liquid chamber 334 through the first flow path 310, and the fluid in the lower front liquid chamber 333 moves to the upper rear liquid chamber 332 through the second flow path 320.

In response to the fluid moving through the first flow path 310 and the second flow path 320 as described above, the axial behavior of the motor module may be damped.

In addition, as illustrated in FIG. 9A to 10B, when external force in the vertical direction is applied to the inner pipe 100, the upper intermediate bridge 341 is deformed with the upper contact portion 341a remaining in contact with the outer pipe 400, and the lower intermediate bridge 342 is deformed with the lower contact portion 342a remaining in contact with the outer pipe 400.

Specifically, when downward external force is applied to the inner pipe 100, the upper contact portion 341a is more stretched than before the application of the downward external force to the inner pipe 100 so as to be straightened to resemble a linear shape while remaining in contact with the outer pipe 400, and the lower contact portion 342a is more curved than before the application of the downward external force to the inner pipe 100 while remaining in contact with the outer pipe 400. Here, the area of the upper contact portion 341a in contact with the outer pipe 400 may be reduced, while the area of the lower contact portion 342a in contact with the outer pipe 400 may be increased. In addition, the volumes of the upper front liquid chamber 331 and the upper rear liquid chamber 332 may be increased, and the volumes of the lower front liquid chamber 333 and the lower rear liquid chamber 334 may be reduced.

In contrast, when upward external force is applied to the inner pipe 100, the lower contact portion 342a is more stretched than before the application of the upward external force to the inner pipe 100 so as to be straightened to resemble a linear shape while remaining in contact with the outer pipe 400, and the upper contact portion 341a is more curved than before the application of the downward external force to the upward external force to the inner pipe 100 while remaining in contact with the outer pipe 400. Here, the area of the lower contact portion 342a in contact with the outer pipe 400 may be reduced, while the area of the upper contact portion 341a in contact with the outer pipe 400 may be increased. In addition, the volumes of the upper front liquid chamber 331 and the upper rear liquid chamber 332 may be reduced, while the volumes of the lower front liquid chamber 333 and the lower rear liquid chamber 334 may be increased.

Figure 10A:
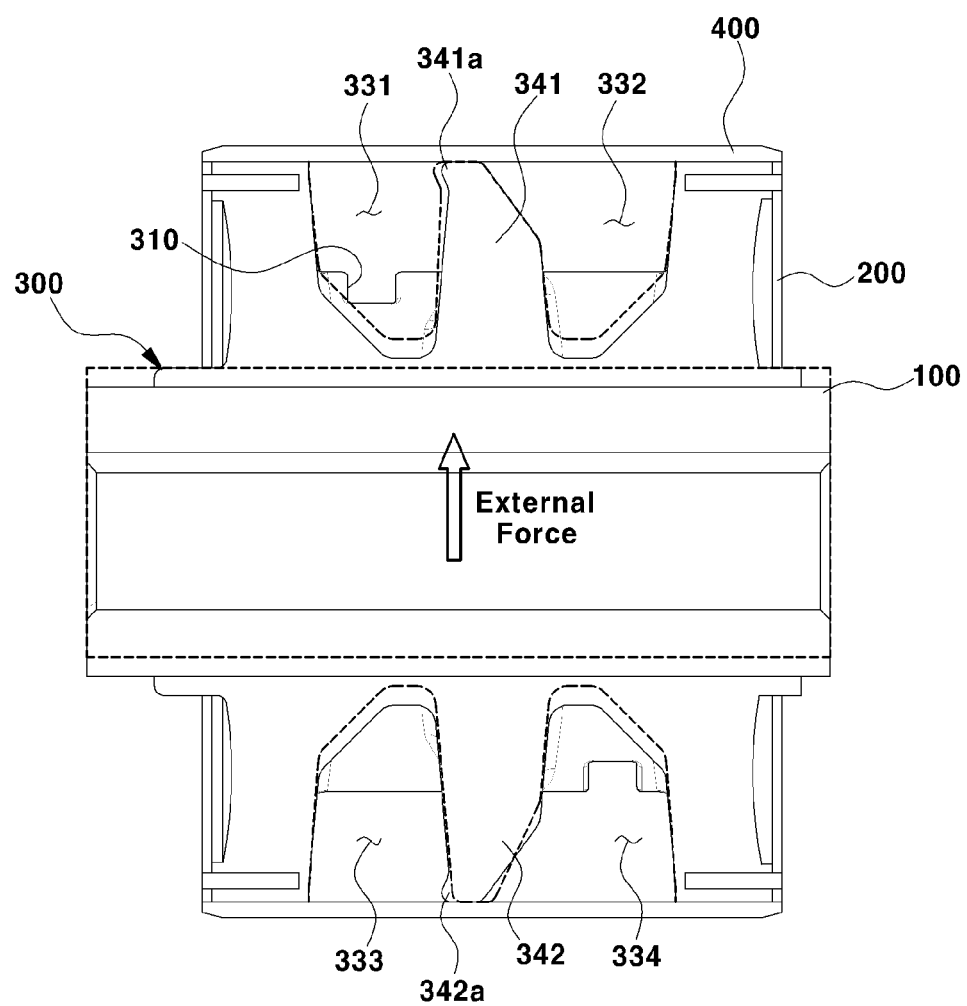

When the downward external force is applied to the inner pipe 100, as illustrated in FIG. 9B, the fluid in the lower rear liquid chamber 334 moves to the upper front liquid chamber 331 through the first flow path 310, and the fluid in the lower front liquid chamber 333 moves to the upper rear liquid chamber 332 through the second flow path 320. In contrast, when the upward external force is applied to the upward external force, as illustrated in FIG. 10B, the fluid in the upper front liquid chamber 331 moves to the lower rear liquid chamber 334 through the first flow path 310, while the fluid in the upper rear liquid chamber 332 moves to the lower front liquid chamber 333 through the second flow path 320.

In response to the fluid moving through the first flow path 310 and the second flow path 320 as described above, the behavior of the motor module in the vertical direction may be damped.

As illustrated in FIG. 5, the main rubber 300 includes front bridges 343 and 345 and rear bridges 344 and 346 fixed to the intermediate pipe 200 and adjacent to the liquid chambers 331, 332, 333, and 334. The front bridges 343 and 345 and the rear bridges 344 and 346 cause the volumes of the liquid chambers 331, 332, 333, and 334 to be changed depending on the states of the upper intermediate bridge 341 and the lower intermediate bridge 342 when the axial external force or the vertical external force is applied to the inner pipe 100.

Specifically, the main rubber 300 includes the upper front bridge 343, the upper rear bridge 344, the lower front bridge 345, and the lower rear bridge 346 fixed to the intermediate pipe 200.

The upper front bridge 343 is disposed in front of and adjacent to the upper front liquid chamber 331, with the outer end thereof being fixed to the front stepped portion 230 of the intermediate pipe 200.

The upper rear bridge 344 is disposed at the rear of and adjacent to the upper rear liquid chamber 332, with the outer end thereof being fixed to the rear stepped portion 240 of the intermediate pipe 200.

The lower front bridge 345 is disposed in front of and adjacent to the lower front liquid chamber 333, with the outer end thereof being fixed to the front stepped portion 230 of the intermediate pipe 200.

The lower rear bridge 346 is disposed at the rear of and adjacent to the lower rear liquid chamber 334, with the outer end thereof being fixed to the rear stepped portion 240 of the intermediate pipe 200.

Here, the front bridges 343 and 345 and the rear bridges 344 and 346 may be configured to surround the outer circumferential surface of the front stepped portion 230 and the outer circumferential surface of the rear stepped portion 240 in order to seal the main rubber 300 and the outer pipe 400.

In addition, each of the height of the upper front bridge 343 and the height of the upper rear bridge 344 is lower than the height of the upper intermediate bridge 341 with respect to the radial direction. That is, the radial height of each of the upper front bridge 343 and the radial height of the upper rear bridge 344 is lower than the radial height of the upper intermediate bridge 341.

In addition, each of the height of the lower front bridge 345 and the height of the lower rear bridge 346 is lower than the height of the lower intermediate bridge 342 with respect to the radial direction. That is, the radial height of each of the lower front bridge 345 and the lower rear bridge 346 is lower than the radial height of the lower intermediate bridge 342.

In addition, the upper intermediate bridge 341 and the lower intermediate bridge 342 may be configured to be tapered outward in the radial direction in order to improve the endurance, connection, and assemblability of the hydraulic mount.

The axial thickness of each of the intermediate bridges 341 and 342 is reduced while each of the intermediate bridges 341 and 342 is tapered outward in the radial direction. Here, each of the intermediate bridges 341 and 342 may be tapered to be biased in one direction with respect to the axial direction. Specifically, each of the intermediate bridges 341 and 342 may have a slope on the front or rear surface in the axial direction.

As illustrated in FIG. 6, since the intermediate bridges 341 and 342 are tapered, the outer end of each of the intermediate bridges 341 and 342 is bent and brought into contact with the outer pipe 400 when the outer pipe 400 is fitted to the outer portion of the main rubber 300 in the axial direction, and the front liquid chambers 331 and 333 and the rear liquid chambers 332 and 334 are divided by the intermediate bridges 341 and 342.

In other words, since the intermediate bridges 341 and 342 are tapered, the outer pipe 400 presses the intermediate bridges 341 and 342 inwardly in the radial direction while being fitted to the outer portion of the main rubber 300. When the fitting of the outer pipe 400 to the main rubber 300 is completed, the outer ends of the intermediate bridges 341 and 342 are in close contact with the inner circumferential surface of the outer pipe 400.

Figure 12:
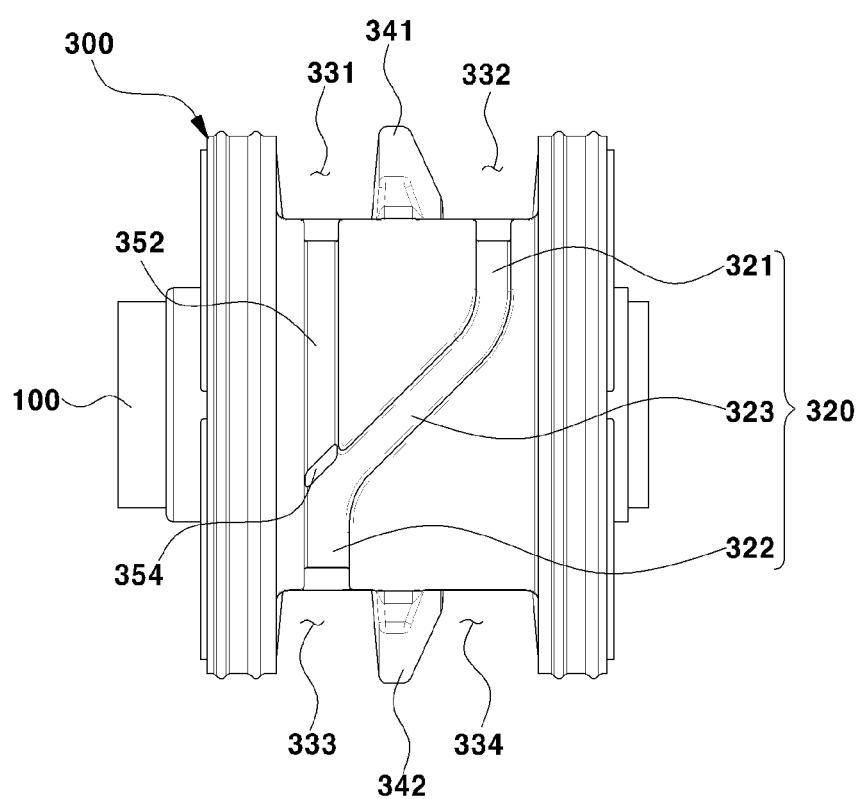

In addition, the main rubber 300 may further include bypass flow paths 351 and 352 and rubber films 353 and 354, as illustrated in FIGS. 11 and 12 in order to selectively reduce fluid pressure occurring on the first flow path 310 and the second flow path 320.

Specifically, the main rubber 300 may further include the first bypass flow path 351 and the second bypass flow path 352 each having the shape of a recess formed on the outer surface thereof and the first rubber film 353 and the second rubber film 354 disposed on the bypass flow paths 351 and 352, respectively.

The first bypass flow path 351 is configured to connect the upper rear liquid chamber 332 and the first flow path 310 such that fluid may move therebetween, and may extend in the circumferential direction of the main rubber 300. Specifically, the first bypass flow path 351 may connect the upper rear liquid chamber 332 and first lower flow path 312 such that fluid may move therebetween.

The second bypass flow path 352 is configured to connect the upper front liquid chamber 331 and the second flow path 320 such that fluid may move therebetween, and may extend in the circumferential direction of the main rubber 300. Specifically, the second bypass flow path 352 may connect the upper front liquid chamber 331 and the second lower flow path 322 such that fluid may move therebetween.

The first bypass flow path 351 and the second bypass flow path 352 may be configured to extend linearly with respect to the circumferential direction of the main rubber 300. The first bypass flow path 351 and the second bypass flow path 352 may have the same widths and depths as the first flow path 310 and the second flow path 320.

Figure 13A:
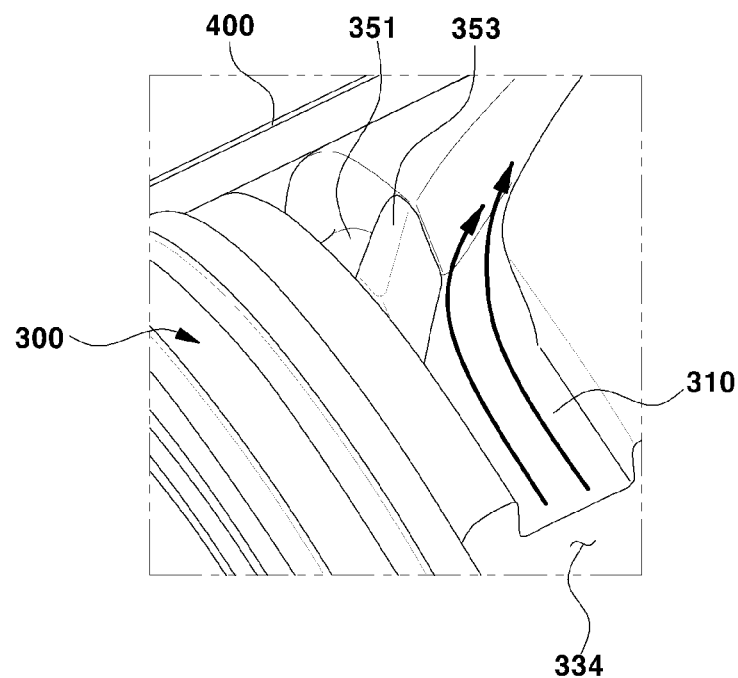
FIGS. 13A to 14B are views an operating state of the hydraulic mount according to the other embodiment of the present disclosure.
Figure 13B:
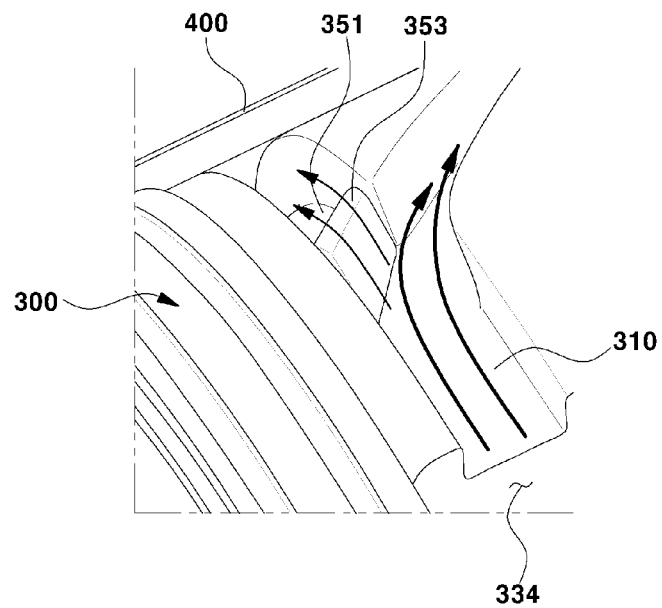

As illustrated in FIGS. 13A and 13B, the first rubber film 353 is configured to be selectively folded by the pressure of fluid in the first flow path 310. The first rubber film 353 is disposed in the first bypass flow path 351 to control a flow of fluid between the first bypass flow path 351 and the first flow path 310. For example, the first rubber film 353 may be disposed at a connection point between the first bypass flow path 351 and the first flow path 310 (i.e. a fluid inlet of the first bypass flow path).

The inner distal end of the first rubber film 353 in the radial direction is integrally molded and fixed to the bottom surface of the first bypass flow path 351 such that the fluid inlet of the first bypass flow path 351 may be opened when the first rubber film 353 is folded by a flow of fluid. In addition, the outer distal end of the first rubber film 353 in the radial direction remains in contact with the inner circumferential surface of the outer pipe 400 such that the fluid inlet of the first bypass flow path 351 may be closed when the first rubber film 353 is not folded by the flow of fluid.

When the first rubber film 353 remains in a standing position instead of being folded by the pressure of fluid, the fluid inlet of the first bypass flow path 351 may be closed to block the flow of fluid between the first bypass flow path 351 and the first flow path 310. When the first rubber film 353 remains in the standing position, the flow of fluid moving from the first flow path 310 toward the first bypass flow path 351 does not occur.

As illustrated in FIG. 13B, when the first rubber film 353 is folded toward the first bypass flow path 351 by the pressure of fluid occurring in the first flow path 310, the first rubber film 353 allows fluid to move between the first bypass flow path 351 and the first flow path 310. When the first rubber film 353 is folded, a flow of fluid moving from the first flow path 310 toward the first bypass flow path 351 occurs, and the pressure of fluid in the first flow path 310 is relatively reduced.

That is, when the first rubber film 353 is folded toward the first bypass flow path 351, the fluid in the first flow path 310 may be allowed to pass through the area that has been occupied by the first rubber film 353 before the first rubber film 353 is folded, thereby flowing toward the first bypass flow path 351.

Figure 14A:
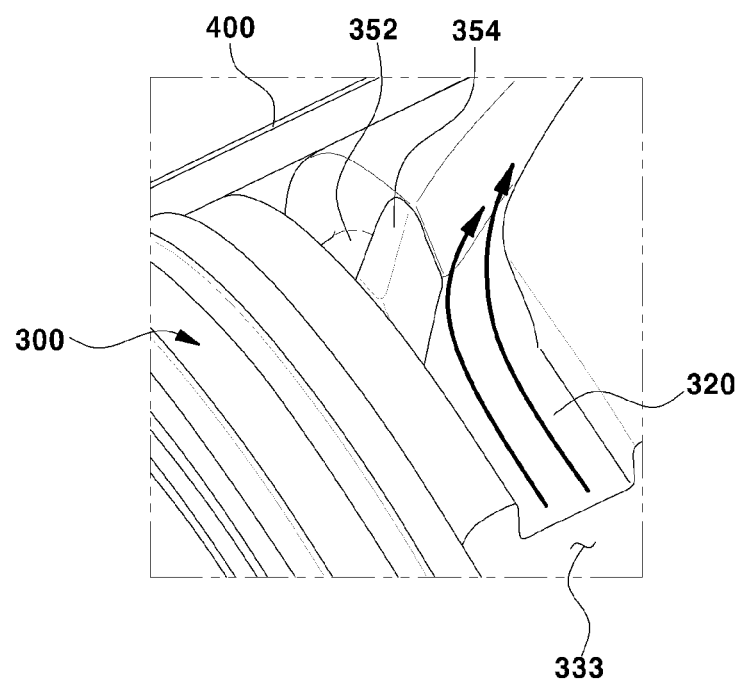
Figure 14B:
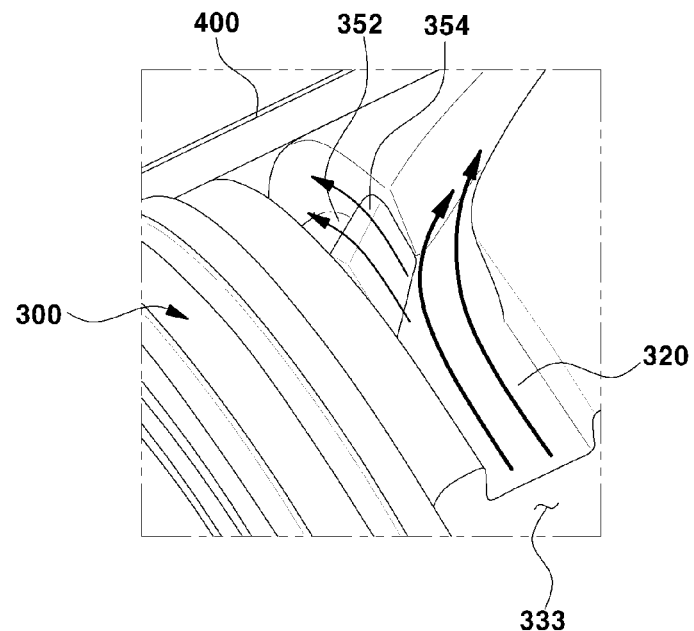
Figure 15:
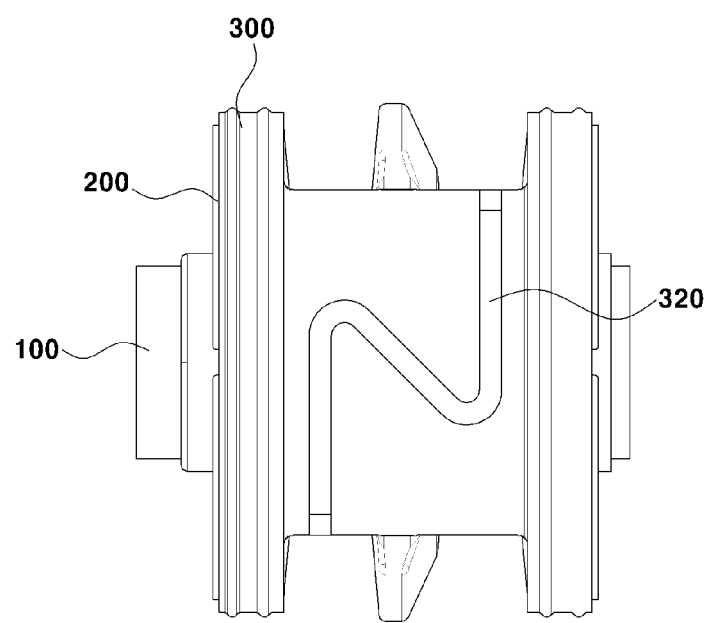
FIG. 15 is a view illustrating a hydraulic mount according to a further embodiment of the present disclosure, from which an outer pipe is omitted.

As illustrated in FIGS. 14A and 14B, the second rubber film 354 is configured to be selectively foldable by the pressure of fluid in the second flow path 320. In addition, the second rubber film 354 may be disposed in the second bypass flow path 352 to control a flow of fluid between the second bypass flow path 352 and the second flow path 320. For example, the first rubber film 353 may be disposed at a connection point between the first bypass flow path 351 and the first flow path 310 (i.e. the fluid inlet of the first bypass fluid path).

The inner distal end of the second rubber film 354 in the radial direction is integrally molded and fixed to the bottom surface of the second bypass flow path 352 such that the fluid inlet of the second bypass flow path 352 may be opened when the second rubber film 354 is folded by the flow of fluid. In addition, the outer distal end of the second rubber film 354 in the radial direction remains in contact with the inner circumferential surface of the outer pipe 400 such that the fluid inlet of the second bypass flow path 352 may be closed when the second rubber film 354 is not folded by the flow of fluid.

When the second rubber film 354 remains in a standing position instead of being folded by the pressure of fluid, the second rubber film 354 may close the fluid inlet of the second bypass flow path 352, thereby blocking a flow of fluid between the second bypass flow path 352 and the second flow path 320. When the second rubber film 354 remains in the standing position, the flow of fluid moving from the second flow path 320 toward the second bypass flow path 352 does not occur.

When the second rubber film 354 is folded toward the second bypass flow path 352 by the pressure of fluid occurring in the second flow path 320, the second rubber film 354 allows the fluid to move between the second bypass flow path 352 and the second flow path 320. When the second rubber film 354 is folded, a flow of fluid moving from the second flow path 320 toward the second bypass flow path 352 occurs, and the pressure of fluid in the second flow path 320 is relatively reduced.

That is, when the second rubber film 354 is folded toward the second bypass flow path 352, the fluid in the second flow path 320 may be allowed to pass through the area that has been occupied by the second rubber film 354, thereby flowing toward the second bypass flow path 352.

In addition, the first rubber film 353 and the second rubber film 354 may be disposed at other positions than the fluid inlets of the bypass flow paths 351 and 352. The first rubber film 353 may be disposed at any position of the first bypass flow path 351 as long as the first rubber film 353 may allow or block the movement of the fluid from the first flow path 310 to the upper rear liquid chamber 332 through the first bypass flow path 351. The second rubber film 354 may be disposed at any position of the second bypass flow path 352 as long as the second rubber film 354 may allow or block the movement of the fluid from the second flow path 320 to the upper front liquid chamber 331 through the second bypass flow path 352.

When the pressure of fluid in the first flow path 310 and the second flow path 320 is increased to a high pressure in response to a relatively large load of external force being input to the inner pipe 100, the first rubber film 353 and the second rubber film 354 may be folded to allow the fluid in the first flow path 310 to bypass to the upper rear liquid chamber 332 and the fluid in the second flow path 320 to bypass to the upper front liquid chamber 331. Thus, it is possible to prevent flow connection of fluid and improve the durability of the main rubber 300.

In addition, the range of a damping frequency may be tuned by changing the lengths of the first flow path 310 and the second flow path 320. Specifically, the range of the damping frequency is expanded with increases in the lengths of the first flow path 310 and the second flow path 320. For example, the length of the second flow path 320 may be variously changed in response to changes in the shape of the second flow path 320 as illustrated in FIG. 5. The length of the first flow path 310 may also be changed like the length of the second flow path 320. Based on changes in the lengths of the first flow path 310 and the second flow path 320, the range of the damping frequency may be variously tuned.

Figure 16:
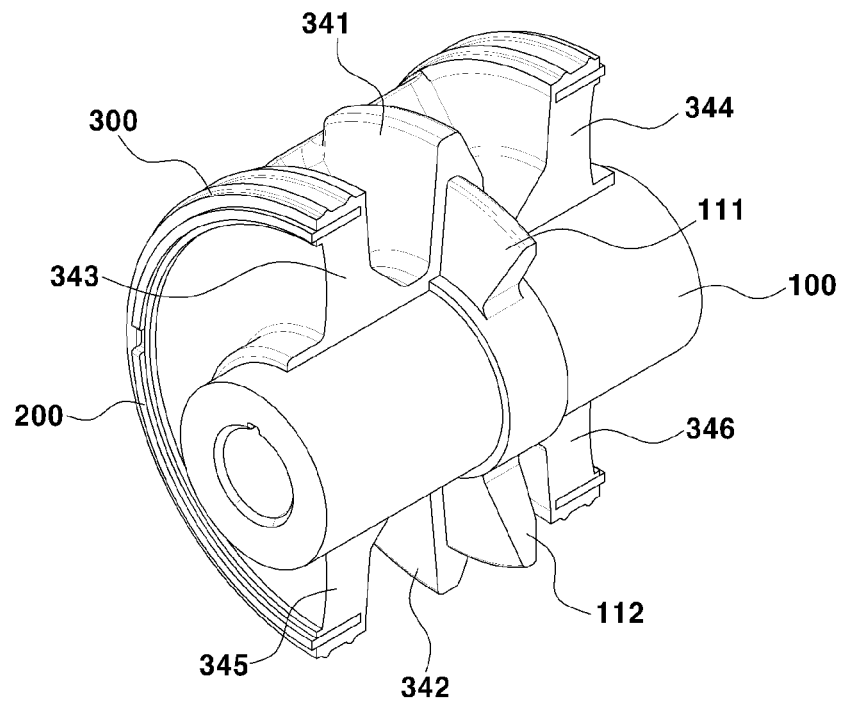
FIG. 16 is a view illustrating the hydraulic mount according to the further embodiment of the present disclosure.

In addition, as illustrated in FIG. 16, intermediate plates 111 and 112 may be provided on the outer circumferential surface of the inner pipe 100. The intermediate plates 111 and 112 may include the upper intermediate plate 111 disposed within the upper intermediate bridge 341 and the lower intermediate plate 112 disposed within the lower intermediate bridge 342.

When the intermediate bridges 341 and 342 are moved by external force, the intermediate plates 111 and 112 may increase the accuracy of the behavior of the intermediate bridges 341 and 342. As the intermediate plates 111 and 112 is enabled to more accurately behave due to the intermediate plates 111 and 112, the effect of damping the hydraulic mount may be improved.

Figure 17:
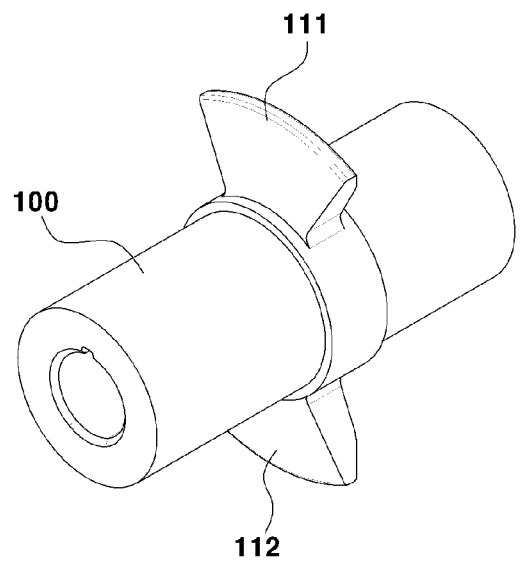
FIG. 17 is a view illustrating the inner pipe and the intermediate plate of the hydraulic mount according to the further embodiment of the present disclosure.

These intermediate plates 111 and 112 may be formed integrally with the inner pipe 100 or, as illustrated in FIG. 17, may be provided as separate components to be press-fitted to the inner pipe 100. The intermediate plates 111 and 112 may be made from aluminum (Al), steel, plastic, or the like.

The hydraulic mount having the above-described configuration may provide the following effects.

First, the axial damping characteristics may be increased, thereby allowing the axial behavior of the motor module to be controlled. Thus, aftershock caused by the axial behavior of the motor module may be reduced. For example, aftershock occurring during sudden departure or during traveling on a bumpy road may be reduced.

Second, the damping characteristics in the load-bearing direction, i.e. the vertical direction, in which the motor module is supported, may be improved, thereby reducing shaking vibration continuously applied during traveling on a level road.

Third, all of the liquid chambers, the flow paths, and the bridges for realizing the axial damping characteristics and the vertical damping characteristics are provided integrally with the main rubber 300. Thus, increases in cost and weight may be minimized compared to the related-art rubber mount.

Fourth, when the main rubber 300 includes the bypass flow paths 351 and 352 and the rubber films 353 and 354, the pressure of fluid moving through the first flow path 310 and the second flow path 320 may be adjusted even in the case that a large load is applied to the inner pipe 100, thereby improving durability and connection.

Although the specific embodiments of the present disclosure have been described in detail hereinabove, the terms or words used herein and in the appended claims should not be interpreted as being limited merely to common and dictionary meanings. In addition, since the embodiments described herein and the features illustrated in the drawings are merely examples of the present disclosure, the scope of the present disclosure is not limited to the foregoing embodiments. Those skilled in the art will could make various modifications and improvements based on the principle of the present disclosure defined in the appended claims without departing from the scope of the present disclosure as defined in the appended claims.

What is claimed is:

1. A hydraulic mount for a vehicle, the hydraulic mount comprising:
   an inner pipe;

a main rubber molded on an outer circumferential surface of the inner pipe and comprising an upper front liquid chamber and an upper rear liquid chamber disposed on upper portions of the main rubber and in a front-back direction, and a lower front liquid chamber and a lower rear liquid chamber disposed on lower portions of the main rubber and in the front-back direction; and an outer pipe fitted to an outer circumferential surface of the main rubber to seal the liquid chambers, wherein the main rubber comprises:

a first flow path connecting the upper front liquid chamber and the lower rear liquid chamber filled with fluid such that the fluid is movable therebetween;

a second flow path connecting the upper rear liquid chamber and the lower front liquid chamber filled with fluid such that the fluid is movable therebetween;

an upper intermediate bridge disposed between the upper front liquid chamber and the upper rear liquid chamber to divide the upper front liquid chamber and the upper rear liquid chamber; and a lower intermediate bridge disposed between the lower front liquid chamber and the lower rear liquid chamber to divide the lower front liquid chamber and the lower rear liquid chamber, wherein the upper intermediate bridge divides the upper front liquid chamber and the upper rear liquid chamber while being in contact with the outer pipe, and wherein the lower intermediate bridge divides the lower front liquid chamber and the lower rear liquid chamber while being in contact with the outer pipe.

2. The hydraulic mount according to claim 1, wherein the first flow path is disposed between the upper front liquid chamber and the lower rear liquid chamber, the second flow path is disposed between the upper rear liquid chamber and the lower front liquid chamber, and the first flow path and the second flow path extend diagonally with respect to an axial direction of the main rubber.

3. The hydraulic mount according to claim 1, wherein the upper front liquid chamber and the lower rear liquid chamber are disposed on different circumferences of the main rubber, and the upper rear liquid chamber and the lower front liquid chamber are disposed on different circumferences of the main rubber.

4. The hydraulic mount according to claim 1, wherein the upper front liquid chamber and the lower front liquid chamber are disposed on the same circumference of the main rubber, and the upper rear liquid chamber and the lower rear liquid chamber are disposed on the same circumference of the main rubber.

5. The hydraulic mount according to claim 1, wherein the upper front liquid chamber is disposed in front of the upper rear liquid chamber, and the lower front liquid chamber is disposed in front of the lower rear liquid chamber.

6. The hydraulic mount according to claim 1, wherein the upper intermediate bridge is in contact with the outer pipe and has a curved outer end, and the outer end thereof slides while being in contact with the outer pipe, in response to axial external force being applied to the inner pipe, and the lower intermediate bridge is in contact with the outer pipe and has a curved outer end, and the outer end thereof slides while being in contact with the outer pipe, in response to axial external force being applied to the inner pipe.

7. The hydraulic mount according to claim 6, wherein the outer end of the upper intermediate bridge is straightened or further curved to remain in contact with the outer pipe in response to vertical external force being applied to the inner pipe, and the outer end of the lower intermediate bridge is straightened or further curved to remain in contact with the outer pipe in response to vertical external force being applied to the inner pipe.

8. The hydraulic mount according to claim 7, wherein, when the outer end of the upper intermediate bridge is straightened, the outer end of the lower intermediate bridge is further curved, and when the outer end of the upper intermediate bridge is further curved, the outer end of the lower intermediate bridge is straightened.

9. The hydraulic mount according to claim 1, wherein the upper intermediate bridge is tapered outward in a radial direction of the main rubber while being biased in one direction with respect to an axial direction, and the lower intermediate bridge is tapered outward in the radial direction of the main rubber while being biased in one direction with respect to the axial direction.

10. The hydraulic mount according to claim 1, wherein the main rubber further comprises an intermediate bridge disposed coaxially with the inner pipe, the main rubber is molded from an outer circumferential surface of the inner pipe to an outer circumferential surface of the outer pipe to cover an outer circumferential surface of the intermediate pipe, and each of the first flow path and the second flow path comprises a recess provided on the outer circumferential surface of the main rubber and is sealed by the outer pipe.

11. The hydraulic mount according to claim 10, wherein the intermediate pipe comprises an upper open area and a lower open area, the upper intermediate bridge is in contact with the outer pipe through the upper open area, and the lower intermediate bridge is in contact with the outer pipe through the lower open area.

12. The hydraulic mount according to claim 10, wherein the intermediate pipe comprises:

a front stepped portion disposed in front of the upper open area and the lower open area and stepped with respect to a central portion of the intermediate pipe; and a rear stepped portion disposed at the rear of the upper open area and the lower open area and stepped with respect to the central portion of the intermediate pipe.

13. The hydraulic mount according to claim 12, wherein the main rubber comprises:

an upper front bridge adjacent to the upper front liquid chamber and fixed to the front stepped portion of the intermediate pipe;

an upper rear bridge adjacent to the upper rear liquid chamber and fixed to the rear stepped portion of the intermediate pipe;

a lower front bridge adjacent to the lower front liquid chamber and fixed to the front stepped portion of the intermediate pipe; and a lower rear bridge adjacent to the lower rear liquid chamber and fixed to the rear stepped portion of the intermediate pipe.

14. The hydraulic mount according to claim 1, wherein the first flow path comprises:

a first upper flow path adjacent to the upper front liquid chamber and extending radially;

a first lower flow path adjacent to the lower rear liquid chamber and extending radially; and a first intermediate flow path disposed between the first upper flow path and the first lower flow path to connect the first upper flow path and the first lower flow path and extending diagonally with respect to an axial direction of the main rubber.

15. The hydraulic mount according to claim 14, wherein the second flow path comprises:
   a second upper flow path adjacent to the upper rear liquid chamber and extending radially;
   a second lower flow path adjacent to the lower front liquid chamber and extending radially; and
   a second intermediate flow path disposed between the second upper flow path and the second lower flow path to connect the second upper flow path and the second lower flow path and extending diagonally with respect to the axial direction of the main rubber.

16. The hydraulic mount according to claim 15, wherein the main rubber comprises:
   a first bypass flow path connecting the upper rear liquid chamber and the first flow path such that fluid is movable therebetween;
   a second bypass flow path connecting the upper front liquid chamber and the second flow path such that fluid is movable therebetween;
   a first rubber film disposed in the first bypass flow path to block a flow of fluid between the first bypass flow path and the first flow path and configured to allow fluid to pass therethrough when the first rubber film is selectively folded toward the first bypass flow path by a pressure of fluid occurring in the first flow path; and
   a second rubber film disposed in the second bypass flow path to block a flow of fluid between the second bypass flow path and the second flow path and configured to allow fluid to pass therethrough when the second rubber film is selectively folded toward the second bypass flow path by a pressure of fluid occurring in the second bypass flow path.

17. The hydraulic mount according to claim 16, wherein the first bypass flow path connects the first lower flow path and the upper rear liquid chamber such that fluid is movable therebetween and extends in a circumferential direction of the main rubber, and
   the second bypass flow path connects the second lower flow path and the upper front liquid chamber such that fluid is movable therebetween and extends in the circumferential direction of the main rubber.

18. The hydraulic mount according to claim 1, further comprising:
   an intermediate plate on the outer circumferential surface of the inner pipe,
   wherein the intermediate plate comprises an upper intermediate plate disposed within an upper intermediate bridge and a lower intermediate plate disposed within a lower intermediate bridge.

* * * * *